(12) United States Patent
Misawa et al.

(10) Patent No.: US 8,199,125 B2
(45) Date of Patent: Jun. 12, 2012

(54) INFORMATION DISPLAY APPARATUS, INFORMATION DISPLAY METHOD AND RECORDING MEDIUM

(75) Inventors: Takeshi Misawa, Saitama (JP); Masako Suehiro, Saitama (JP)

(73) Assignee: FujiFilm Corporation, Tokyo (JP)

( * ) Notice: Subject to any disclaimer, the term of this patent is extended or adjusted under 35 U.S.C. 154(b) by 0 days.

(21) Appl. No.: 13/142,201

(22) PCT Filed: Dec. 22, 2009

(86) PCT No.: PCT/JP2009/071846
§ 371 (c)(1),
(2), (4) Date: Jun. 24, 2011

(87) PCT Pub. No.: WO2010/074310
PCT Pub. Date: Jul. 1, 2010

(65) Prior Publication Data
US 2012/0019563 A1     Jan. 26, 2012

(30) Foreign Application Priority Data

Dec. 26, 2008  (JP) .................................. 2008-334523

(51) Int. Cl.
G04F 3/033     (2006.01)
G06F 3/041     (2006.01)
G09G 5/00      (2006.01)
(52) U.S. Cl. .......................... 345/173; 345/156; 715/863
(58) Field of Classification Search .......... 345/156–184; 178/18.01–20.04; 715/730–732, 815, 838
See application file for complete search history.

(56) References Cited

U.S. PATENT DOCUMENTS

| 7,905,782 B2 * | 3/2011 | Sawano et al. .................. 463/39 |
| 7,954,068 B2 * | 5/2011 | Riggs et al. .................... 715/838 |
| 2006/0001650 A1 * | 1/2006 | Robbins et al. ............... 345/173 |
| 2006/0026521 A1 * | 2/2006 | Hotelling et al. ............. 715/702 |

(Continued)

FOREIGN PATENT DOCUMENTS

CN    101052939 A    10/2007

(Continued)

OTHER PUBLICATIONS

International Search Report dated Feb. 23, 2010 for PCT/JP2009/071846.

*Primary Examiner* — Alexander Eisen
*Assistant Examiner* — Patrick F Marinelli
(74) *Attorney, Agent, or Firm* — Birch, Stewart, Kolasch & Birch, LLP

(57) ABSTRACT

An information display method includes steps of: detecting a touch position of an object on a screen of a display unit; determining whether a plurality of touch positions are detected; detecting a motionless touch position which is motionless for a predetermined time period in the plurality of detected touch positions; detecting a behavior of a touch position other than the motionless touch position among the plurality of detected touch positions; detecting an instruction corresponding to the behavior of the touch position; and controlling, in accordance with the motionless touch position and the detected instruction, the display unit to reduce an display area of a kept image, the image being displayed on the display unit when the motionless touch position is detected, to a predetermined size to continue displaying the reduced kept image, and to display an image other than the reduced kept image.

9 Claims, 20 Drawing Sheets

U.S. PATENT DOCUMENTS

| | | |
|---|---|---|
| 2006/0161871 A1 | 7/2006 | Hotelling et al. |
| 2008/0168403 A1* | 7/2008 | Westerman et al. ........... 715/863 |
| 2010/0125786 A1* | 5/2010 | Ozawa et al. ................. 715/702 |
| 2011/0035708 A1* | 2/2011 | Damale ......................... 715/863 |

FOREIGN PATENT DOCUMENTS

| | | |
|---|---|---|
| DE | 202005021427 U1 | 3/2008 |
| EP | 1621989 A2 | 2/2006 |
| EP | 1934685 A1 | 6/2008 |
| JP | 2000-13725 A | 1/2000 |
| JP | 2005-229325 A | 8/2005 |
| JP | 2008-508600 A | 3/2008 |
| JP | 2008-508601 A | 3/2008 |
| JP | 2008-79193 A | 4/2008 |
| KR | 10-2007-0039613 A | 4/2007 |
| WO | WO 2006/020304 A2 | 2/2006 |
| WO | WO 2006/020305 A2 | 2/2006 |
| WO | WO 2007/037807 A1 | 4/2007 |

* cited by examiner

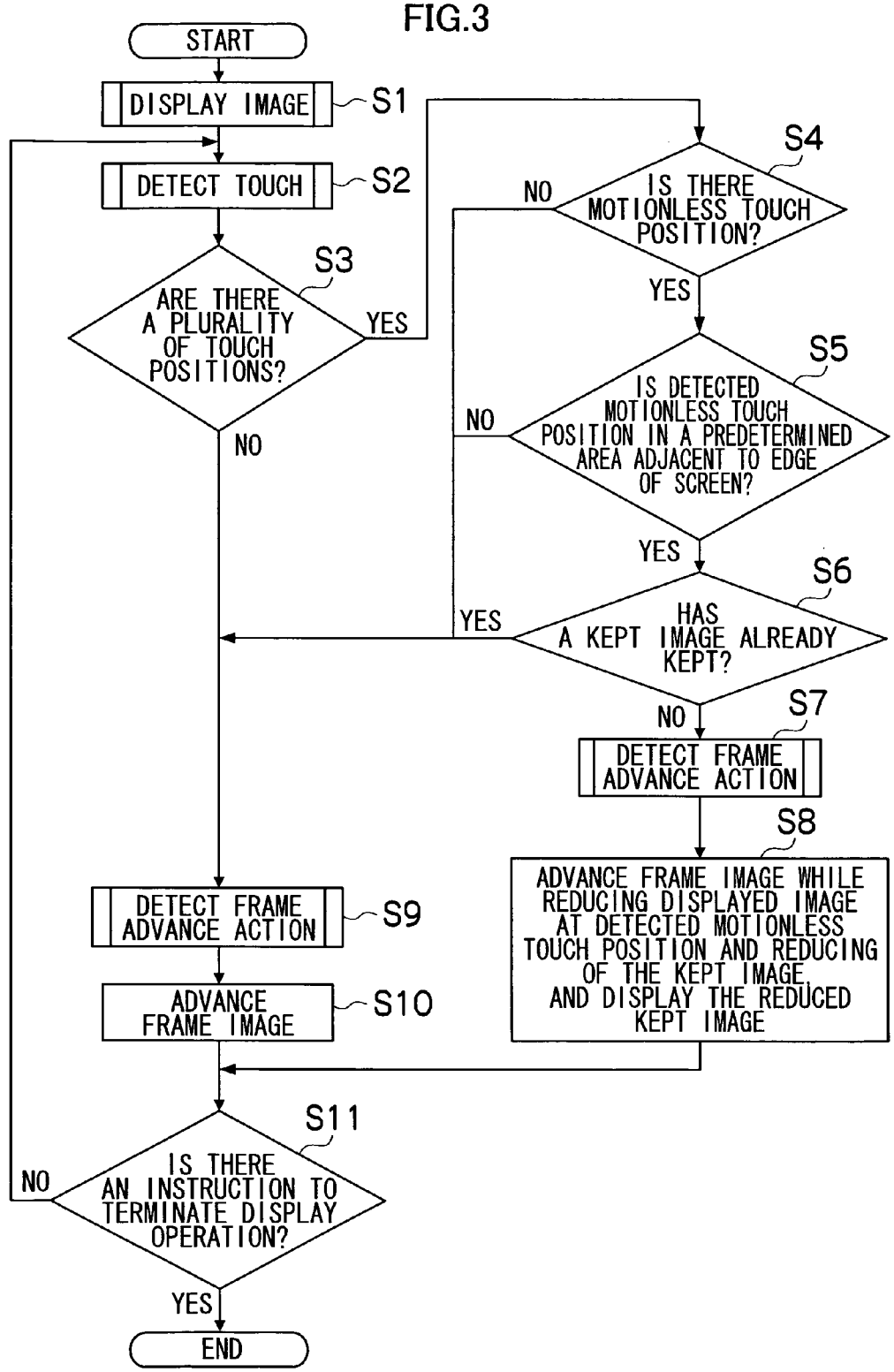

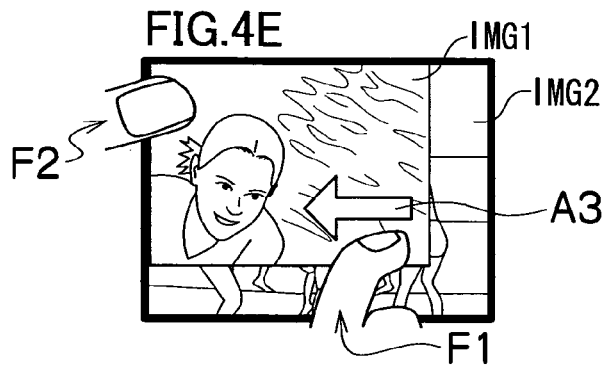
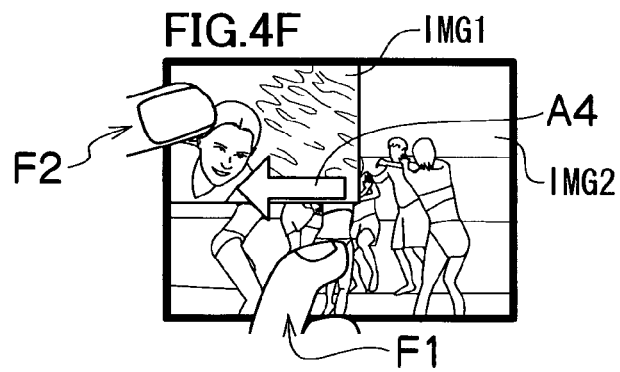
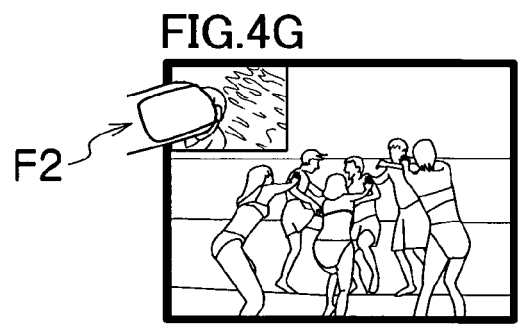
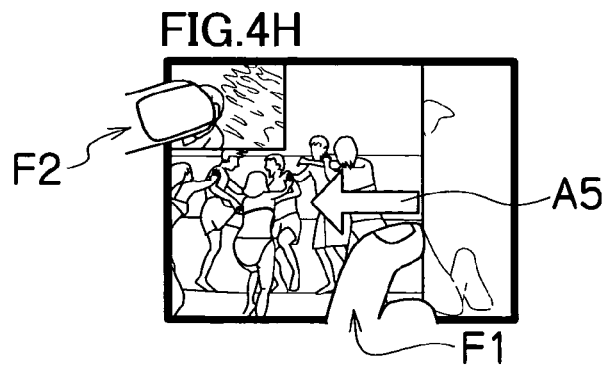

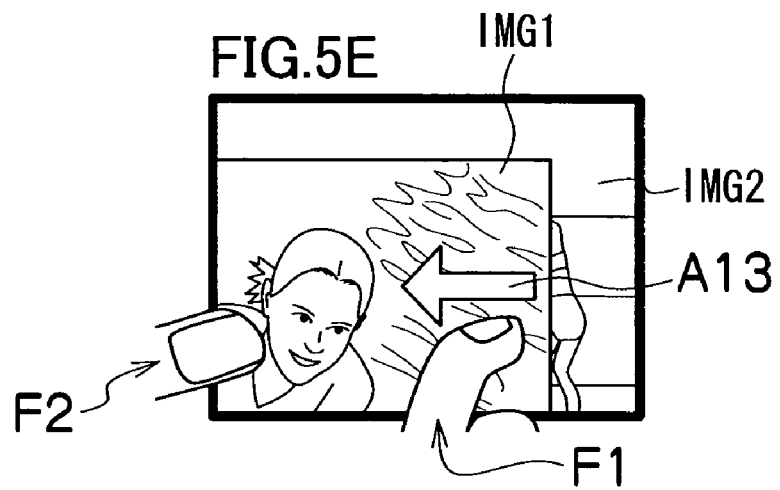
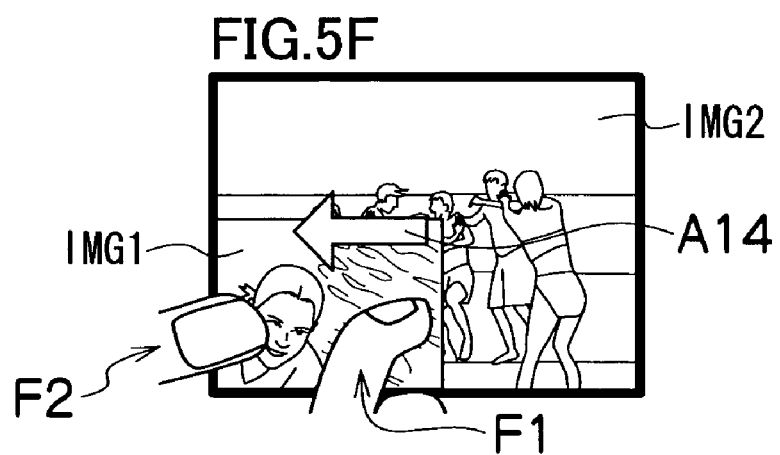
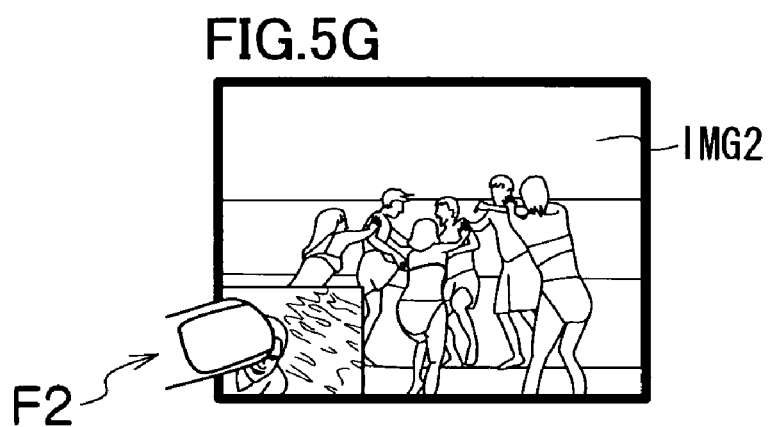

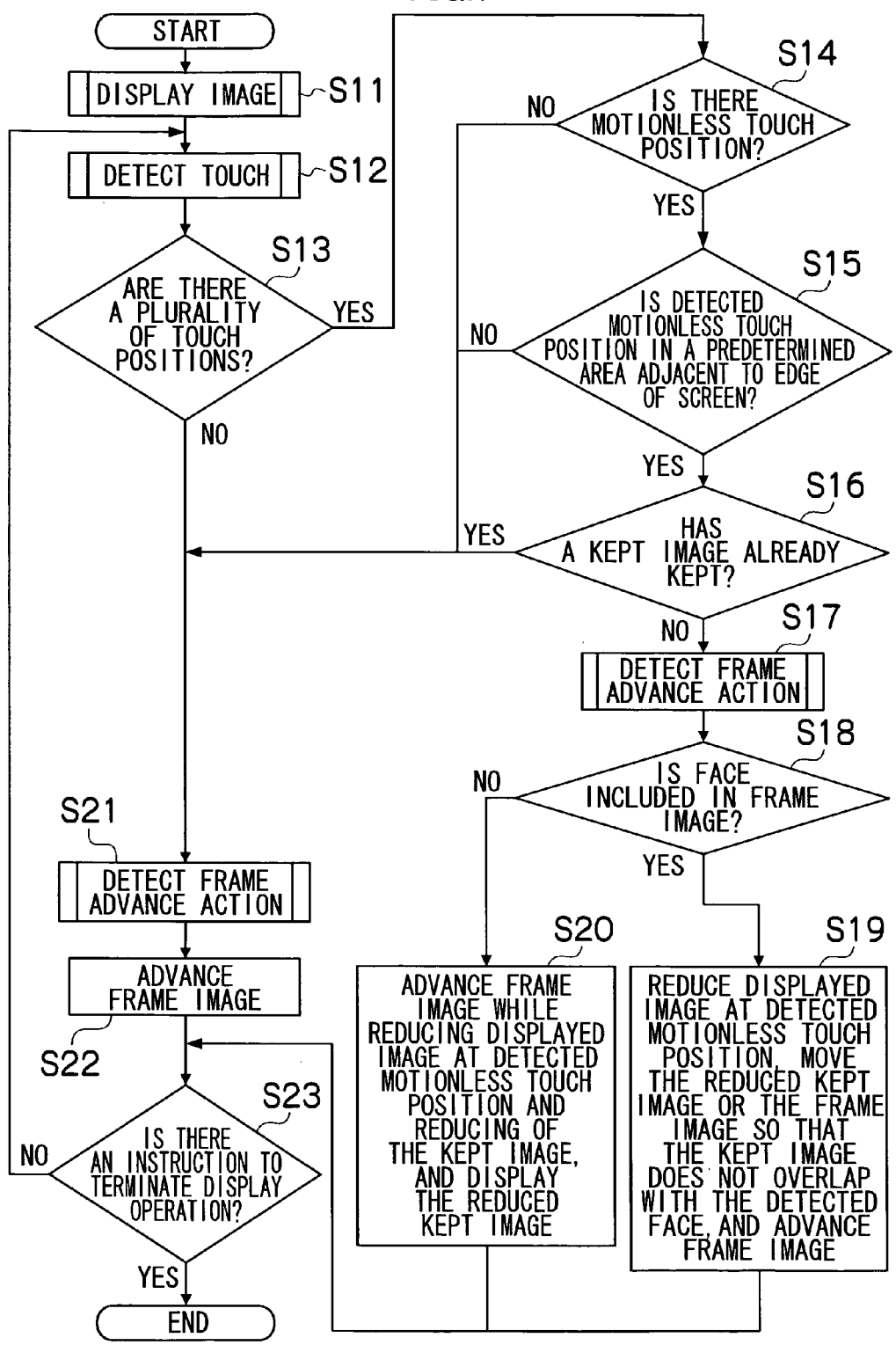

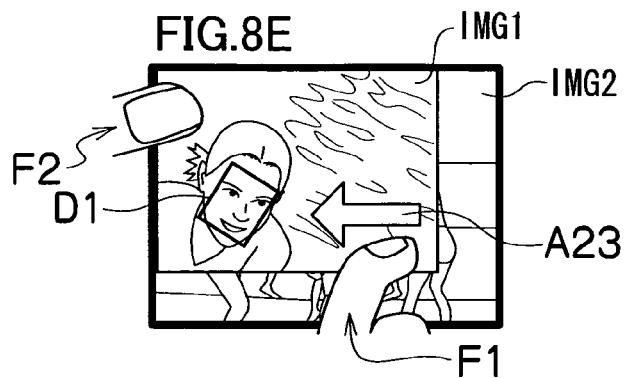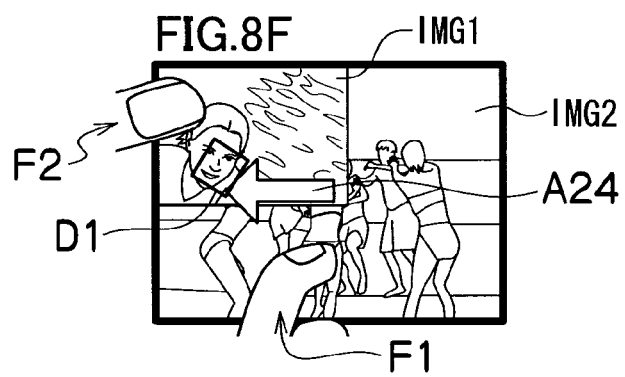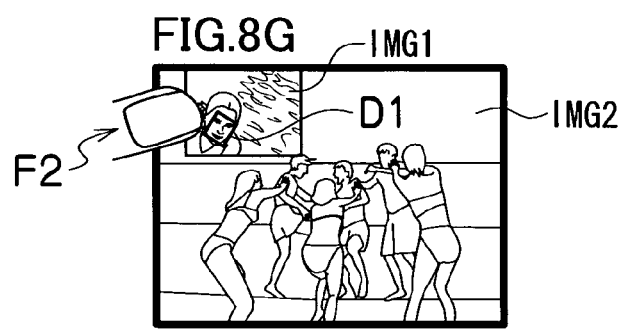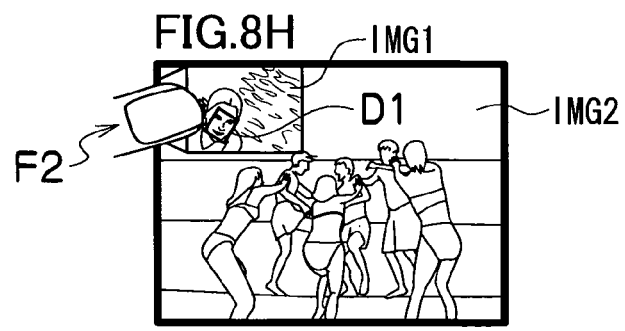

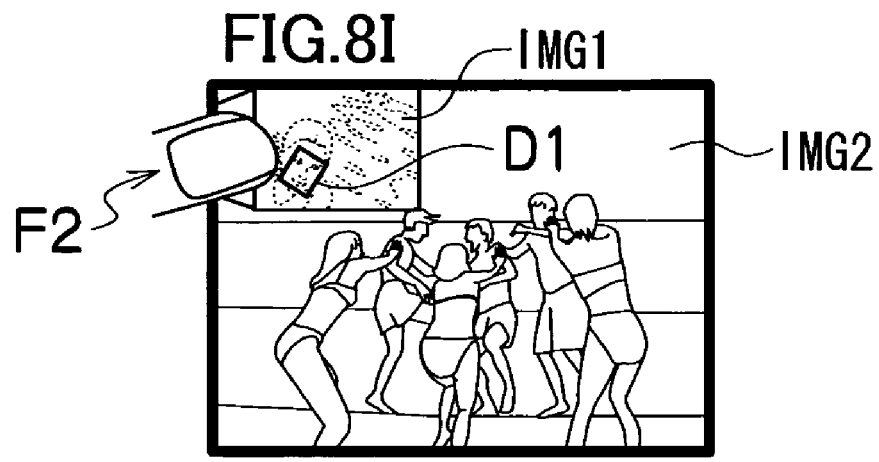
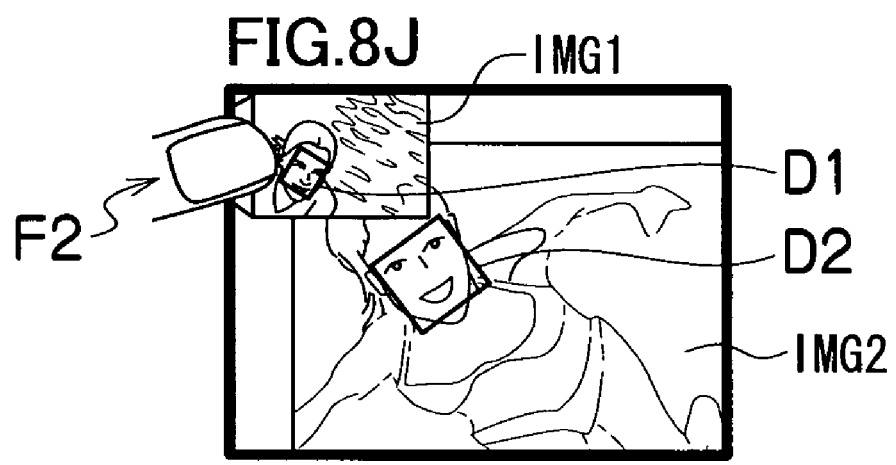

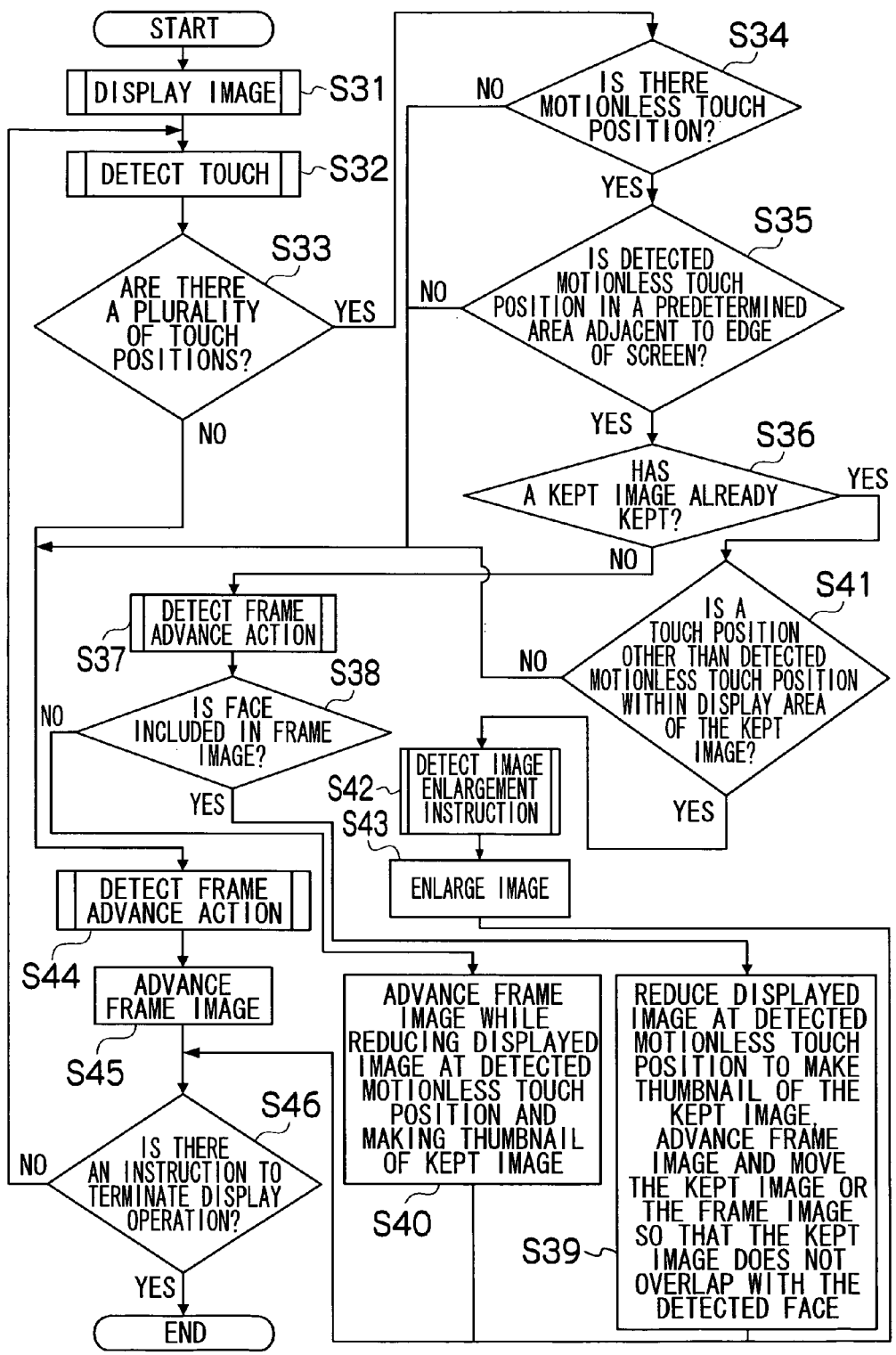

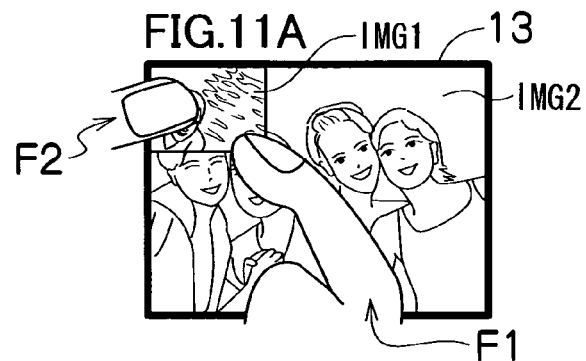
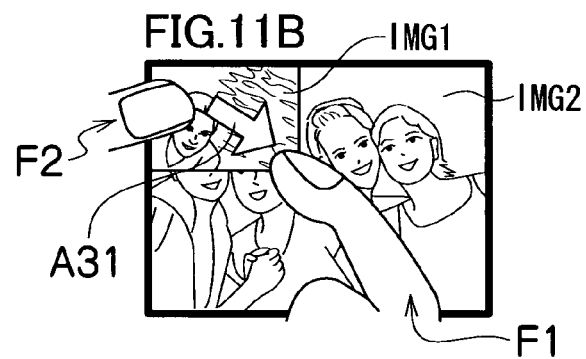
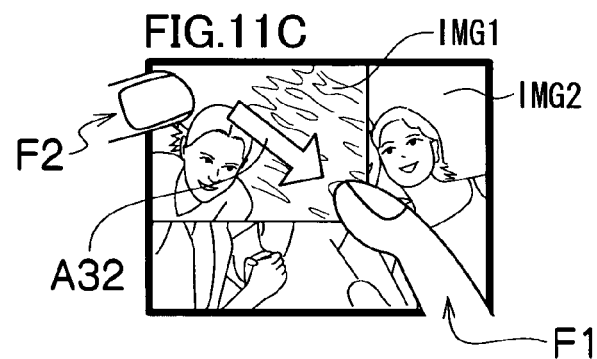

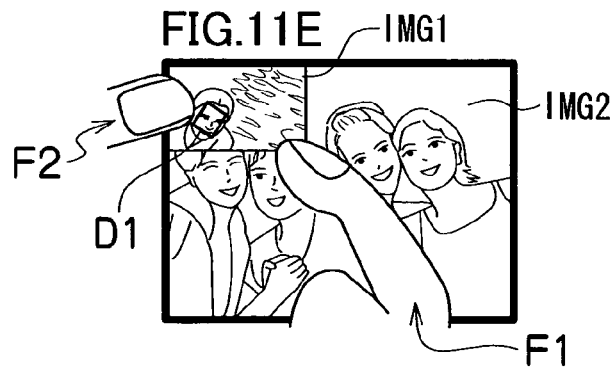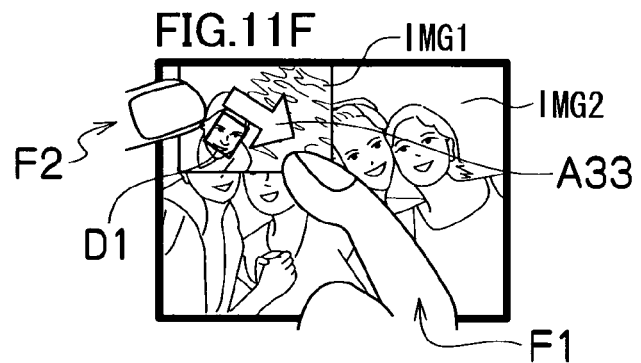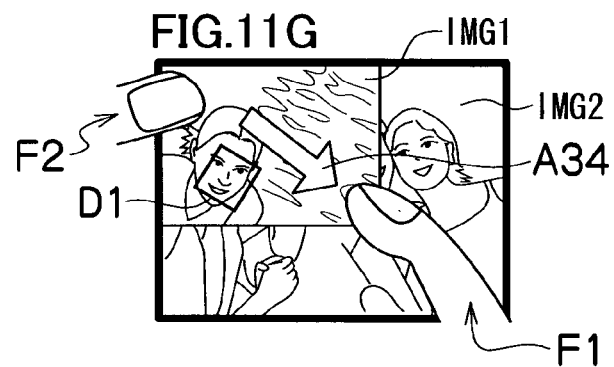

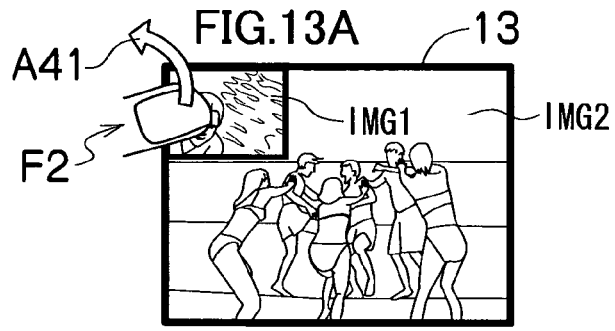
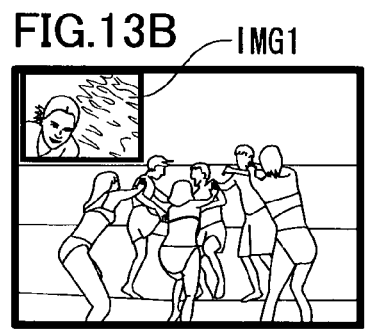
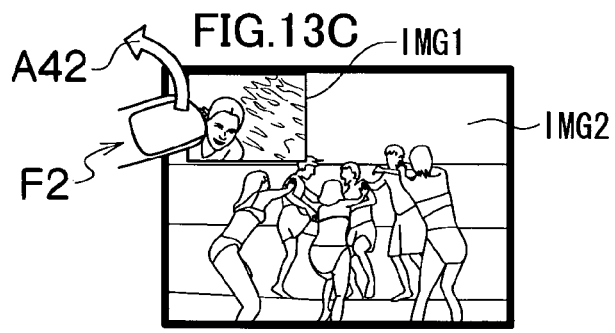
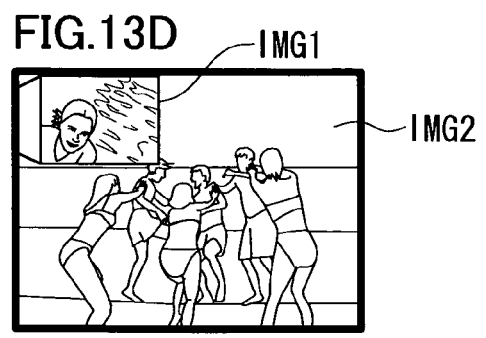

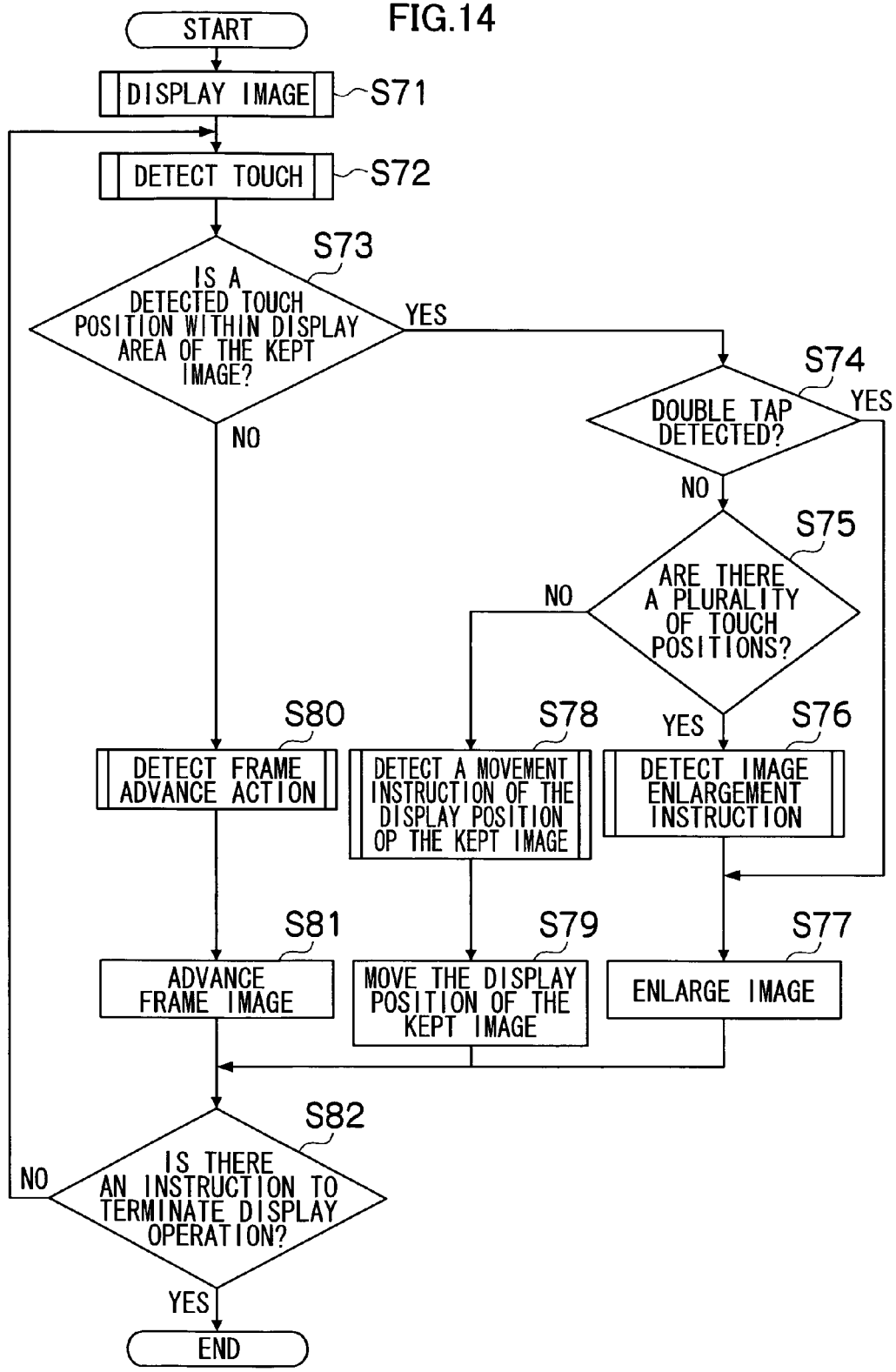

INFORMATION DISPLAY APPARATUS, INFORMATION DISPLAY METHOD AND RECORDING MEDIUM

TECHNICAL FIELD

The presently disclosed subject matter relates to an information display apparatus which receives an operation instruction by a contact operation.

BACKGROUND ART

PTL 1 discloses an apparatus which includes a non-volatile memory which stores high-resolution image data and thumbnail image data of the same image, and a liquid crystal monitor which displays an image based on the image data inputted from the non-volatile memory. The liquid crystal monitor displays the image on an entire screen of the monitor based on the thumbnail image data when a frame advance button is pressed. Therefore, for example, to display images as an index, the images can be displayed on the entire screen based on the thumbnail image data. As a result, the time for image processing is reduced, and the images are quickly displayed.

PTL 2 discloses a digital camera which includes a liquid crystal monitor which displays a live view image and a recorded image, and the monitor including a horizontally wide display screen with "3:6" aspect ratio. In a photography standby state, the display screen is divided into a maximum display area A with "3:4" aspect ratio and other areas B and C. A live view image is displayed on the maximum display area A. A last image recorded in the last photographing is displayed on the area B, and an image recorded before the last image in the last photographing but one is displayed on the area C. The last image and the image recorded before the last image displayed in the areas B and C respectively are updated every time an image is photographed. In the photography standby state, preparations for photographing such as flaming can be performed with reference to the last subject image, and furthermore, a user can check the photographic result immediately after the photographic operation.

PTLs 3 and 4 disclose an example of a contact-type or approximate contact-type operation apparatus. PTL 5 discloses an apparatus which zooms in an image when a plurality of fingers are spread, and zooms out an image when the plurality of fingers are closed. The apparatus disclosed in PTL 5 changes a displayed page of an electronic book according to the direction of swiping (wiping operation).

Citation List

Patent Literature

PTL 1: Japanese Patent Application Laid-Open No. 2000-13725

PTL 2: Japanese Patent Application Laid-Open No. 2005-229325

PTL 3: Japanese Patent Application Laid-Open No. 2008-79193

PTL 4: U.S. Patent Application Publication No. 2006/0161871

PTL 5: Japanese National Publication of International Patent Application No. 2008-508601

SUMMARY OF THE INVENTION

Technical Problem

When a person read a paper medium such as a printed book, the person often puts her or his finger on a page which she or he wishes to reread later while reading another page. When view a plurality of images by a display apparatus which includes an operation device which receives a contact operation of a finger of a user, it is significantly convenient to hold display information such as images which the user wishes to review later with a simple operation. Further, it is convenient to allow the user to recognize what the kept information is. However, when displaying an image, the apparatus disclosed in PTL 1 superimposes only a thumbnail image of a previous image recorded before the displayed image and a thumbnail image of a next image recorded after the displayed image on the displayed image. Therefore, a user cannot view an image recorded before the previous image and an image recorded after the next image immediately. The camera disclosed in PTL 2 displays the last image and the image recorded before the last image which are photographed before at a corner of the screen during photographing. Therefore, a desired image recorded before the image recorded before the last image cannot be displayed immediately.

The presently disclosed subject matter provides an information display apparatus, information display method and a recording medium including a computer program causing a computer to execute a process for a information display processing for temporarily keeping information such as favorite information and information which a user wishes to review later with a simple operation, and explicitly showing the kept information to the user. The presently disclosed subject matter also provides a user interface which allows an easy operation for reviewing the information.

Solution to Problem

The presently disclosed subject matter provides an information display apparatus including a display unit which includes a screen for displaying an image; a touch detection unit which detects a touch position of an object on the screen of the display unit; a counting unit which determine whether a plurality of touch positions are detected; a motionlessness detection unit which detects a motionless touch position which is motionless for a predetermined time period in the plurality of detected touch positions; a behavior detection unit which detects a behavior of a touch position other than the motionless touch position detected by the motionlessness detection unit among the plurality of detected touch positions; an instruction detection unit which detects an instruction corresponding to the behavior of the touch position detected by the behavior detection unit; and a control unit which controls, in accordance with the motionless touch position detected by the motionlessness detection unit and the instruction detected by the instruction detection unit, the display unit to reduce an display area of a kept image, the image being displayed on the display unit when the motionless touch position is detected, to a predetermined size to continue displaying the reduced kept image, and to display an image other than the reduced kept image.

According to the presently disclosed subject matter, the display of the image (the kept image) can be easily continued just by fixing the touch position. This is significantly convenient when, for example, a user wishes to view another image with reference to the kept image.

The control unit controls the display unit to continue displaying the reduced kept image on or adjacent to the detected motionless touch position.

Since the kept image is displayed on or adjacent to an object such as a finger which fixes the touch position, the user can recognize that the kept image is kept for displaying as well as the content of the kept image.

The information display apparatus may further includes an area detection unit which detects an area including a face from the kept image, wherein the control unit controls the display unit to continue displaying the reduced kept image at a position where the area including the face detected by the area detection unit do not overlap with the motionless touch position.

When the kept image includes an object of interest such as a face, the object of interest is not hidden in the display. Therefore, an important part of the image such as the face in the image can be clearly recognized.

The control unit controls the display unit to display predetermined information, which indicates that the display of the kept image is kept, on or adjacent to the motionless touch position.

By displaying the kept image on or adjacent to the detected motionless touch position, the user can clearly recognize that the display of the kept image is held.

The behavior detection unit detects a behavior of a touch position within a display area of the reduced kept image, the instruction detection unit detects an enlargement instruction of the reduced kept image at the touch position based on the behavior of the touch position within the display area of the reduced kept image detected by the behavior detection unit, and the control unit controls the display unit to enlarge the reduced kept image to a predetermined size, and displays the enlarged kept image in accordance with the detection of the enlargement instruction by the instruction detection unit.

The holding target information can be enlarged if necessary.

The instruction detection unit detects the enlargement instruction of the reduced kept image at the touch position based on a tap and drop operation or a double tap operation within the display area of the reduced kept image.

The tap and drop operation reminds the user of an operation of enlarging an image, and can be intuitively understood by the user. An enlargement by the double tap operation is effective for a quick enlargement.

The control unit controls the display unit to continue displaying the reduced kept image until the instruction detection unit detects a display termination instruction to terminate the display of the kept image.

Hand and other contact objects do not have to be kept still to hold information.

The instruction detection unit detects a display switch instruction to switch a display of an image other than the reduced kept image based on a slide operation, and the control unit controls the display unit to sequentially switch and display different image in accordance with the detection of the display switch instruction by the instruction detection unit.

The slide operation reminds the user of a flip operation of pages, and can be intuitively understood by the user.

The presently disclosed subject matter provides an information display method for displaying an image by an information display apparatus including a display unit which includes a screen for displaying an image, including steps of: detecting a touch position of an object on the screen of the display unit; determining whether a plurality of touch positions are detected; detecting a motionless touch position which is motionless for a predetermined time period in the plurality of detected touch positions; detecting a behavior of a touch position other than the motionless touch position among the plurality of detected touch positions; detecting an instruction corresponding to the behavior of the touch position; and controlling, in accordance with the motionless touch position and the detected instruction, the display unit to reduce an display area of a kept image, the image being displayed on the display unit when the motionless touch position is detected, to a predetermined size to continue displaying the reduced kept image, and to display an image other than the reduced kept image.

The presently disclosed subject matter provides a recording medium including a computer program causing an information display apparatus including a display unit which includes a screen for displaying an image, to execute a process for a displaying the image, the process including: detecting a touch position of an object on the screen of the display unit; determining whether a plurality of touch positions are detected; detecting a motionless touch position which is motionless for a predetermined time period in the plurality of detected touch positions; detecting a behavior of a touch position other than the motionless touch position among the plurality of detected touch positions; detecting an instruction corresponding to the behavior of the touch position; and controlling, in accordance with the motionless touch position and the detected instruction, the display unit to reduce an display area of a kept image, the image being displayed on the display unit when the motionless touch position is detected, to a predetermined size to continue displaying the reduced kept image, and to display an image other than the reduced kept image.

The above described aspects of the presently disclosed subject matter may be provided as a program which causes an apparatus including a display section such as a computer, a camera and an image reproduction apparatus to execute the above described procedures. Also, the above aspects of the presently disclosed subject matter may be provided as software and a computer program product in a computer-readable recording medium for use in controlling the apparatus.

Advantageous Effects of Invention

According to the presently disclosed subject matter, the display of information can be easily continued just by fixing a touch position. The presently disclosed subject matter is significantly convenient when, for example, the next image is viewed while some images are referenced.

BRIEF DESCRIPTION OF THE DRAWINGS

FIG. 3 is a flowchart illustrating a display process of the first embodiment;

FIGS. 4A to 4J are diagrams illustrating an example of image display in the display process of the first embodiment;

FIGS. 5A to 5G are diagrams illustrating another example of image display in the display process of the first embodiment;

FIG. 7 is a flowchart illustrating a display process of the second embodiment;

FIGS. 8A to 8J are diagrams illustrating an example of image display in the display process of the second embodiment;

FIG. 10 is a flowchart illustrating a display process of the third embodiment;

FIGS. 11A to 11H are diagrams illustrating an example of image display in the display process of the third embodiment;

FIGS. 13A to 13D are diagrams illustrating an example of image display in the display process of the fourth embodiment; and FIG. 14 is a flowchart illustrating a display process of a fifth embodiment.

DESCRIPTION OF EMBODIMENTS

<First Embodiment>

Figure 1:
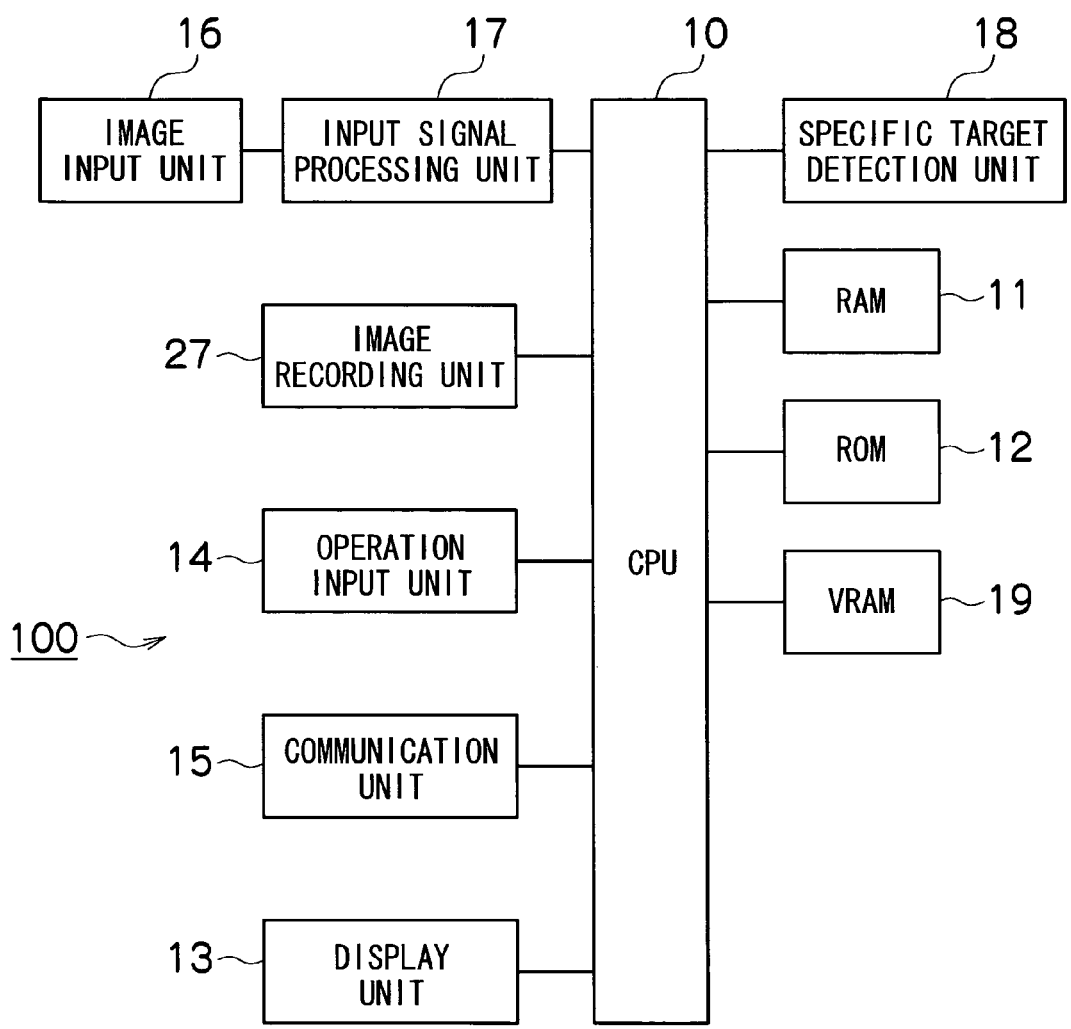
FIG. 1 is a block diagram illustrating an information display apparatus of a first embodiment.

FIG. 1 is a block diagram of an information display apparatus 100. The information display apparatus 100 is, for example, a cell phone including a camera, a digital camera, a PDA (Personal Digital Assistant), a portable AV (audio-visual) player, or the like.

The information display apparatus 100 includes an image input unit 16 including an image pickup lens and a solid-state image sensor such as a CMOS (complementary metal-oxide semiconductor) and a CCD (charge-coupled device), an analog front end circuit for processing an analog image signal read out from the solid-state image sensor of the image input unit 16, an input signal processing unit 17 including a signal processing circuit such as a DSP (Digital Signal Processor) for processing a digital image signal acquired by converting the analog image signal from the analog front end circuit, a CPU (Central Processing Unit) 10 which is, for example, a one-chip microcomputer and which manages control of photographic operation of the input signal processing unit 17 and operation control of other components, a ROM (Read Only Memory) 12 for storing various data and programs, a RAM (Random Access Memory) 11 for storing various data required for processing by the CPU 10, and a specific target detection unit 18.

The ROM 12 stores control programs and parameters for the CPU 10 to control the blocks in accordance with operation instructions to an operation input unit 14. The operation input unit 14 includes a touch panel unit 31 described below, an operation button and an audio operation recognition circuit.

The image pickup lens of the image input unit 16 includes a zoom lens whose optical zoom magnification is, for example, "2". The optical zoom magnification is changed by moving the image pickup lens to the telephoto side or the wide-angle side by a motor driven by a motor driver in accordance with a magnification changing operation inputted from the operation input unit 14. The magnification of the image pickup lens is not limited to the one described above. The image input unit 16 includes an aperture. An appropriate amount of exposure is obtained by controlling the aperture through the motor driver.

When an image shooting mode is set by the operation input unit 14, the CPU 10 make the display unit 13 display a moving image (live view image), and enables a user to check an angle of view. The solid-state image sensor converts a subject light formed on a light receiving surface of the image sensor into a signal charge, an amount of the signal charge corresponding to an amount of the light. The signal charge stored in each pixel as a voltage signal (analog image signal) corresponding to an amount of the signal charge are read out sequentially and individually based on a driver pulse provided from a timing generator in accordance with an instruction by the CPU 10. The analog front end circuit performs predetermined image processing on the analog image signal. The analog image signal is converted into a digital signal by an A/D (analog-to-digital) converter. The digital signal is inputted to the signal processing circuit.

The signal processing circuit includes a gain adjusting circuit, a brightness signal/color difference signal generation circuit, a gamma correction circuit, a sharpness correction circuit, a contrast correction circuit, a white balance correction circuit, a contour processing unit for performing image processing including contour correction to a photographed image and a noise reduction processing unit for executing a noise reduction process of the image. The signal processing circuit processes the digital signal according to a command inputted by the CPU 10.

The digital signal (image data) inputted to the signal processing circuit is converted into a brightness signal (Y signal) and a color difference signal (Cr signal and Cb signal), and is subject to a predetermined process such as gamma correction. Then, the signal (Y/C signal including Y signal, Cr and Cb signal) is stored in a VRAM (Video RAM) 19.

When the photographed image is outputted on a screen of the display unit 13, the Y/C signal is read out from the VRAM 19 and transmitted to a display control unit 37. The display control unit 37 converts the inputted Y/C signal into a signal in a predetermined display system, for example, color composite video signal in a system of NTSC (National Television System Committee), and outputs the signal to the display unit 13.

The YC signal of the each frame processed at a predetermined frame rate is alternately written into an "A" area and a "B" area of the VRAM 19. The written Y/C signal is read out from one of the "A" area and the "B" area of the VRAM 19 in which the Y/C signal is not being written. In this way, the Y/C signal in the VRAM 19 is periodically rewritten, and a video signal generated from the Y/C signal is supplied to the display unit 13. Then, a video being photographed is displayed on the display unit 13 in real time. The user can check the angle of view with the video (live view image) displayed on the display unit 13.

When a photographic key of the operation input unit 14 is pressed, a photographic operation for storage starts. The signal processing circuit converts the image data acquired in response to the pressing of the photographic key into a brightness/color difference signal (Y/C signal), applies the predetermined process such as gamma correction to the signal, and stores the signal in the RAM 11.

The Y/C signal stored in the RAM 11 is compressed by a compression/expansion processing circuit according to a predetermined format, and then stored in an image recording unit 27 as an image file in a predetermined format such as an Exif (Exchangeable image file format) file. A communication unit 15 can transmit the image file and other information to an external device in accordance with TCP/IP (Transmission Control Protocol/Internet Protocol) or other standards. The communication unit 15 can also receive information such as an image file from an external device, and store the information in the image recording unit 27 or the RAM 11.

When a playback mode is set by the operation input unit 14, compressed image data of a last image file (file stored lastly) stored in the image recording unit 27 is read out. When the last image file is a still image file, the read out compressed image data is expanded to an uncompressed Y/C signal through the compression/expansion processing circuit, and saved in the VRAM 19. The Y/C signal saved in the VRAM 19 is inputted to the display control unit 37 described below. The display control unit 37 creates an RGB color composite video signal in NTSC system from an inputted Y/C signal, and outputs the RGB color composite video signal to the display unit 13. Then, the display unit 13 displays a frame image of the last image file (last frame) stored in the image recording unit 27.

Subsequently, when a right key of a cross key of the operation input unit 14 is pressed, or when a slide operation to the left side of the screen (a frame advance action) is detected by the touch panel unit 31 included in the operation input unit 14, the frame advances forward (in ascending order) in accordance with the photographing date and time or alphabets of the file name included in an Exif tag of the image file. When a left key of the cross key is pressed, or when a slide operation to the right side of the screen (a frame backward action) is detected by the touch panel unit 31 included in the operation input unit 14, the frame advances backward (in descending order). An image file at the advanced frame position is read out from the image recording unit 27, and the frame image is played back on the display unit 13 as described above. If the frame advances forward when the frame image of the last frame is displayed, an image file of the first frame stored in the image recording unit 27 is read out, and the frame image of the first frame is played back on the display unit 13.

A pixel size of the stored image file is, for example, one of 2832×2128 (6 M, 6 mega pixels), 2048×1536 (3 M, 3 mega pixels), 1280×960 (1 M, 1 mega pixels), and 640×480 (VGA, Video Graphics Array). The amount of data (file size) of the photographed image changes according to combination of a stored quality and a stored number of pixels.

The image input unit 16 can be any device for importing an image from the outside of the information display device 100. The image input unit 16 may be replaced by a communication apparatus (the communication unit 15), a media reader (the image recording unit 27), and the like in addition to an image pickup device of the present embodiment. The information inputted to the image input unit 16 and the information displayed on the display unit 13 are not limited to the still images, but may include various digital contents which can be outputted as video, such as moving images, character information, and character information with documentary form (information written in a markup language such as an HTML (HyperText Markup Language) document and an XML (Extensible Markup Language) document). To simplify the description, it is assumed that the information is a still image hereinafter.

Figure 2:
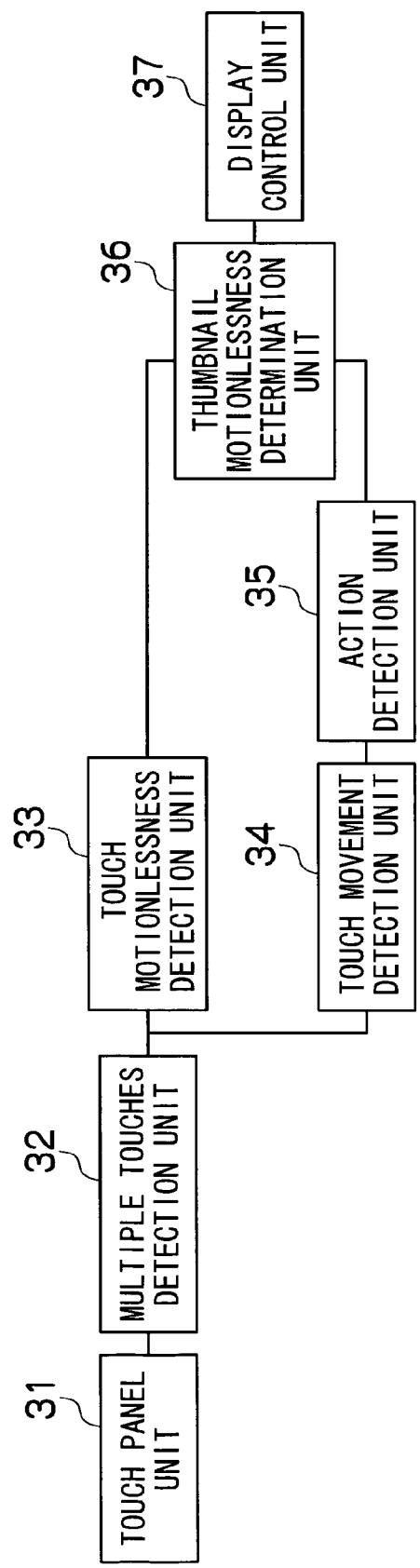
FIG. 2 is a block diagram illustrating a part of the information display apparatus of the first embodiment.

FIG. 2 is a block diagram illustrating a part of the information display apparatus 100. The information display apparatus 100 includes a touch panel unit 31, a multiple touches detection unit 32, a touch motionlessness detection unit 33, a touch movement detection unit 34, an action detection unit 35, a thumbnail motionlessness determination unit 36 and a display control unit 37. The multiple touches detection unit 32, the touch motionlessness detection unit 33, the touch movement detection unit 34, the action detection unit 35, the thumbnail motionlessness determination unit 36 and the display control unit 37 may be processing units of programs (stored in the ROM 12) executed by the CPU 10, or may be separate logic circuits.

The touch panel unit 31 is laminated on the display unit 13, and transmits an electric signal to the CPU 10, the signal indicating the pressed position which is represented as a coordinate on the screen of the display unit 13. The touch panel unit 31 is one of components of the operation input unit 14.

The display control unit 37 controls emission luminance and emission color of a luminous body of the display unit 13 in accordance with the control by the CPU 10 to control a desired information display. Information to be displayed is provided by the input signal processing unit 17, the image recording unit 27, the RAM 11, the ROM 12 and the communication unit 15 in accordance with an instruction of the CPU 10. Typically, although the display information includes image data and auxiliary information of the image data (information included in the Exif tag of the image file) stored in the image file of the image recording unit 27, information inputted from other paths may be included in the display information.

The multiple touches detection unit 32 determines a total number of the pressed positions (independent pressed areas) on the touch panel unit 31, and notifies the determination result to the CPU 10.

The touch motionlessness detection unit 33 determines the presence of a motionless pressed position, and notifies a determination result to the thumbnail motionlessness determination unit 36. Whether the pressed position is motionless or not can be determined based on whether the detected pressed position does not move to a different position, and the pressing at substantially the same position continues for more than a predetermined time (for example, more than one second). The pressed position is motionless when the detected pressed position does not move to a different position, and the pressing at substantially the same position continues for more than the predetermined time.

The touch movement detection unit 34 detects a moving operation to the touch panel unit 31 at a position other than the motionless pressed position, and notifies the detection result to the action detection unit 35. The moving operation includes a vertical or horizontal slide operation, and a clockwise or counterclockwise rotation operation. The touch movement detection unit 34 also detects a stop of the moving operation to the touch panel unit 31, and notifies a detection result to the action detection unit 35.

The action detection unit 35 determines an action in accordance with the moving operation detected by the touch movement detection unit 34. For example, when a slide operation of the pressed position to the right side of the screen is detected, the action detection unit 35 determines that the action indicated by the operation is the frame forward. When a slide operation of the pressed position to the left side of the screen is detected, the action detection unit 35 determines that the action indicated by the operation is a frame backward. When a vertical slide operation of the pressed position is detected, the action detection unit 35 determines that the action indicated by the operation is expanding or minifying of the displayed image. When a clockwise or counterclockwise rotation operation is detected, the action detection unit 35 determines that the action indicated by the operation is clockwise or counter clockwise rotation of the image. If the action detection unit 35 determines that the moving operations are stopped, the action detection unit 35 determines the stop of the actions.

When the action detection unit 35 determines that the action indicated by the touch operation is a frame forward or backward action, and the touch motionlessness detection unit 33 detects a motionless state of a touch position which is separated from the touch operation indicating the frame forward or backward action, the thumbnail motionlessness determination unit 36 determines that an image keep instruction is inputted. The image keep instruction is an instruction for accepting a frame forward or backward action while continuing to display a minified image which is made by minifying the frame image displayed on the display unit 13 to a predetermined size. The thumbnail motionlessness determination unit 36 notifies a determination result to the display control unit 37. The minified image only needs to include data for display. The minified image is unnecessary to be recorded in the image recording unit 27, unlike a thumbnail image of an Exif file. Therefore, the minified image may be a Y/C signal existing in the RAM 11.

The display control unit 37 displays the minified image of the frame image at a predetermined position on the screen of the display unit 13 in accordance with the determination result of the thumbnail motionlessness determination unit 36, the frame image being displayed on the display unit 13 when the image keep instruction is inputted (detected). The display control unit 37 switches the display of the frame image according to a frame forward or backward action.

FIG. 3 is a flowchart illustrating a display process which the CPU 10 executes according to a first embodiment. The ROM 12 stores a program for the CPU 10 to execute the process.

In step S1, the information display apparatus 100 displays a frame image which is stored in the image recording unit 27 firstly or lastly, on the screen of the display unit 13 in accordance with a touch detection of the touch panel unit 31.

In step S2, after the display of the frame image, the multiple touches detection unit 32 detects a touch (pressing) position, and determines whether a number of the touch positions is singular or plural.

In step S3, the multiple touches detection unit 32 determines whether the number of the touch positions is plural (whether the user touches a plurality of positions in the screen at a time or in a predetermined time). If "YES" (the number of the touch positions is plural), the process proceeds to step S4. If "NO" (the number of the touch positions is singular), the process proceeds to step S9.

In step S4, the touch motionlessness detection unit 33 determines whether at least one of the plurality of touch positions is still (motionless) for the predetermined time period. That is, the user keeps touching one position for the predetermined time period. If "YES" (at least one of the plurality of touch positions is motionless), the touch motionlessness detection unit 33 indicates the position as a motionless touch position, and the process proceeds to step S5. If "NO" (all the touch positions is not motionless), the process proceeds to step S9.

In step S5, it is determined whether or not any one of the plurality of still (motionless) touch positions is in a predetermined area adjacent to the edge of the screen (a reserve area) set in the display area of the display unit 13 is determined. If "YES" (any one of the still touch positions is positioned in a reserve area), it is determined that there is an image keep instruction, and the process proceeds to step S6. If "NO" (none of the still touch positions is positioned in a reserve area), it is determined that there is no image keep instruction, and the process proceeds to step S9.

If the reserve area is set within an area where a finger (thumb) required for holding the information display apparatus 100 can reach, the reserve area can be used for holding the apparatus 100 and for an image keep instruction. In this case, less burden is imposed on the user. An image indicating the reserve area may be indicated on the screen. The CPU 10 may determine the set position of the reserve area according to the handedness of the user. For example, the CPU 10 determines that the set position of the reserve area is in a left margin of the screen of the display unit 13 if it is determined that the user is right handed. The CPU 10 determines that the set position of the reserve area is in a display surface right margin of the display unit 13 if it is determined that the user is left handed. More specifically, a right handed user can issue a keep instruction with the left hand, and a left handed user can issue a keep instruction with the right hand. Furthermore, the user can input a frame forward or backward action with the dominant hand.

A known method can be used to determine the handedness of the user. The operation input unit 14 may accept a selection of handedness to determine the handedness by the selection, or as described in Japanese Patent Application Laid-Open No. 04-205137, the handedness may be determined based on on/off of switches corresponding to the handedness or based on handedness information corresponding to the personal information of the user. The "finger" is just an example of an object for performing a contact operation (including approximation contact), and a pen or other writing tools may replace the finger.

In step S6, it is determined whether or not a reduced kept image is already displayed on the display unit 13. If "YES" (the reduced kept image is already displayed on the display unit 13), the process proceeds to step S9. If "NO" (the reduced kept image is not already displayed on the display unit 13), the process proceeds to step S7. A plurality of keep instructions by a plurality of fingers may be separately recognized, and the plurality of keep instructions may be simultaneously or sequentially accepted.

In step S7, the touch movement detection unit 34 determines a slide operation to the right or left side of the screen of the display unit 13.

In step S8, the kept image which is a frame image displayed at the time of the determination of the image keep instruction is reduced and displayed at a predetermined position of the display unit 13. The predetermined position is, for example, on or adjacent to the still pressed position (keep position) detected by the touch motionlessness detection unit 33. At the same time, the currently displayed frame image is switched to a frame image next in the order or previous in the order according to the frame forward or backward action. The display of the transition state of switching of the frame image will be arbitrary. Examples of the display include edge wipe transition effect, iris wipe transition effect, clock wipe transition effect, matrix wipe transition effect, fade transition effect, push transition effect, and slide transition effect. The slide transition effect would be appropriate for the switching in accordance with the slide operation.

Even if the frame image is switched, the display of the kept image is maintained. It is up to the user which frame image would be set as a kept image. If the touch motionlessness detection unit 33 does not detect a still pressed position any more after the completion of the reduction of the kept image, or if a special instruction for terminating the display of the kept image is inputted to the operation input unit 14, the display of the reduced kept image may be terminated. Alternatively, even if the touch motionlessness detection unit 33 does not detect the still pressed position any more, the display of the kept image may be continued unless the special instruction for terminating the display of the kept image is inputted to the operation input unit 14. Alternatively, even if the touch motionlessness detection unit 33 does not temporarily detect the still pressed position, the display of the kept image may be continued if substantially the pressed position is detected at substantially the same position again within a predetermined time (for example, one second). Which of the above will be performed may be selected from the operation input unit 14.

In step S9, a frame forward or backward action is detected.

In step S10, the displayed frame image is switched to the frame image next in the order or previous in the order in accordance with the frame forward or backward action. The kept image is not displayed unless it is already determined in step S6 that the image keep instruction is issued.

In step S11, it is determined whether a terminating instruction to terminate the display operation is issued from the operation input unit 14. If "YES" (the terminating instruction is issued), the process ends, and if "NO" (the terminating instruction is not issued), the process returns to step S2.

FIGS. 4A to 4J illustrate an example of image display in accordance with a frame forward or backward action and an image keep instruction. Arrows A1 to A6 in FIGS. 4A to 4J indicate the direction along which the finger moves, and the arrows A1 to A6 are not information or an image displayed on the display unit 13.

Figure 4A:
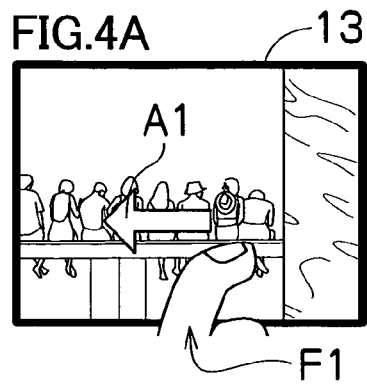
Figure 4B:
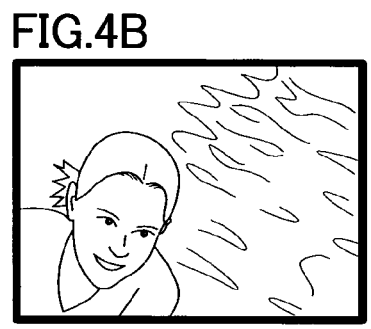

In FIG. 4A, a slide operation to the left side of the screen (indicated by an arrow A1) by a finger F1 of the user, for example, the right index finger, on the display unit 13 laminated on the touch panel unit 31a is detected, and then the frame backward action is determined. A transition from the currently displayed frame image to the previous frame image is made with the slide transition effect, and then the user can achieve an operational feeling that the user traces and flips the image. In FIG. 4B, the transition is completed, and the previous frame image is displayed.

Figure 4C:
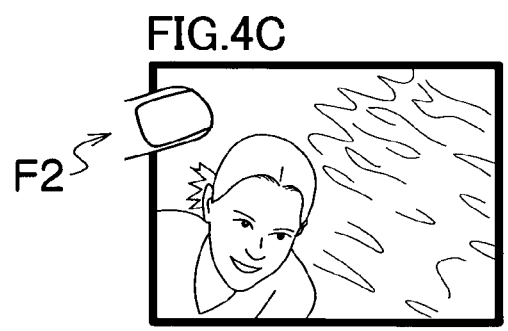
Figure 4D:
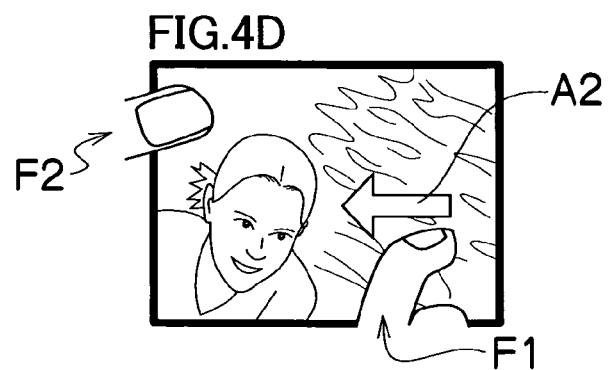

In FIG. 4C, the upper left portion of the screen of the display unit 13 is pressed by a finger F2 of the user, for example, the left thumb, and the position pressed by the finger F2 is fixed. In FIG. 4D, the slide operation to the left (indicated by arrows A2 to A4) is started while the pressed position pressed by the finger F2 being fixed, and then, it is determined that an image keep instruction is issued.

In FIGS. 4E and 4F, a transition from the currently displayed frame image IMG1 to the next frame image IMG2 is made in accordance with the slide operation (indicated by arrows A2 to A4). However, an effect indicating the state of transition in the case there is an image keep instruction differs from an effect indicating the state of transition in the case there is no image keep instruction. If there is an image keep instruction, the kept image (the currently displayed frame image) IMG1 is gradually reduced toward the keep position (the pressed position pressed by the finger F2) in accordance with the slide operation by the finger F1. In the area excluding the display area of the kept image being reduced, the frame image IMG2 to be displayed next instructed by the slide operation is displayed.

As shown in FIG. 4G, if the kept image IMG1 displayed on or near the keep position is reduced to a predetermined size, the reduction of the kept image IMG1 is terminated. And, the reduced kept image IMG2 is continued to display on or near the keep position. As a result, the user can recognize that the continuance of the desired image display is secured. During the reduction of the kept image IMG1, the scale indicating the final reduced size of the kept image IMG1 may be displayed in the screen or the reserve area. The next frame image IMG2 instructed by the slide operation is displayed in the area excluding the display area of the reduced kept image IMG1. Subsequently, as shown in FIGS. 4H to 4J, if a slide operation by the finger F1 (indicated by arrows A5 and A6) is further detected within the display area of the currently displayed current frame image, the previous or subsequent frame image corresponding to the slide operation is displayed in the area excluding the display area of the reduced kept image IMG1. The effect of the transition of the frame image excluding the kept image is the same as in the transition of the frame image without the keep instruction, and the frame image is switched with the slide transition effect in this example.

FIGS. 5A to 5G illustrate another example of image display in accordance with a frame forward or backward action and an image keep instruction. Arrows A11 to A14 indicate the direction along which the finger moves, and the arrows A11 to A14 are not information displayed on the screen.

Figure 5A:
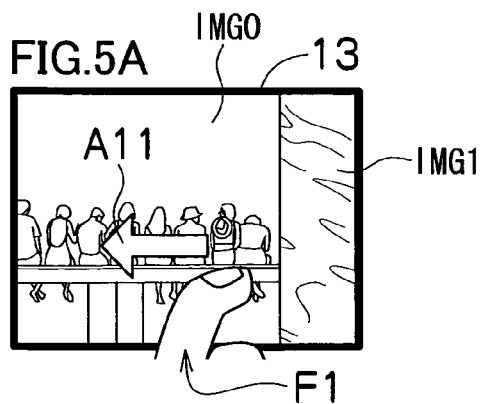
Figure 5B:

In FIG. 5A, a slide operation (indicated by an arrow A1) to the left by a finger F1 of the user, for example, the right index finger, on the display unit 13 laminated on the touch panel unit 31 is detected, and a frame forward action is determined. Then, a transition from the currently displayed frame image (current frame image) IMG0 to the next frame image IMG1 is made with the slide transition effect. If the sliding to the left is stopped and the finger F1 slides to the right, the forward action is cancelled, and the display returns to the current frame image IMG0 from the next frame image IMG1. In case of FIG. 5B, the transition is completed, and the next frame image IMG1 is displayed.

Figure 5C:
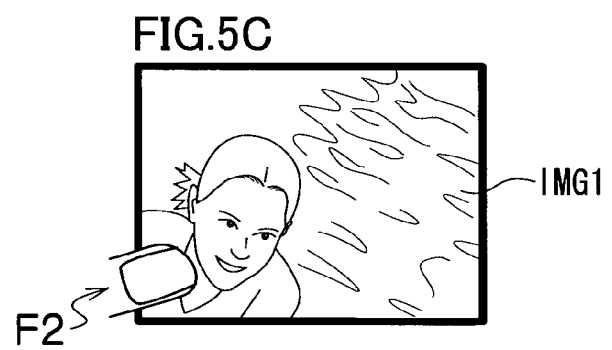
Figure 5D:
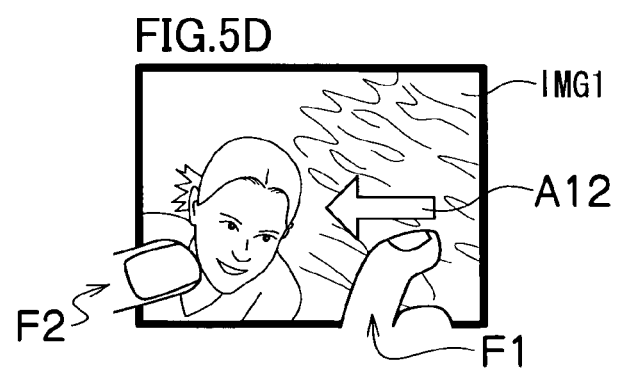

In FIG. 5C, the lower left portion of the screen of the display unit 13 is pressed by a finger F2 of the user, for example, the left thumb, and the position pressed by the finger F2 is fixed. In FIG. 5D, the slide operation to the left (indicated by arrows A12 to A14) is started while the pressed portion pressed by the finger F2 being fixed, and then, it is determined that an image keep instruction is issued.

In FIGS. 5E and 5F, a transition from the currently displayed frame image IMG1 to the next frame image IMG2 is made in accordance with the slide operation (indicated by arrows A12 to A14). However, an effect indicating the state of transition in the case there is an image keep instruction differs from an effect indicating the state of transition in the case there is no image keep instruction. If there is an image keep instruction, the kept image (the currently displayed frame image) IMG1 is gradually reduced toward the keep position (the pressed position pressed by the finger F2) in accordance with the slide operation by the finger F1. In the area excluding the display area of the kept image being reduced, the frame image IMG2 to be displayed next instructed by the slide operation is displayed.

As shown in FIG. 5G, if the kept image IMG1 displayed on or near the keep position is reduced to a predetermined size, the reduction of the kept image IMG1 is terminated. And, the reduced kept image IMG2 is continued to display on or near the keep position. As a result, the user can recognize that the continuance of the desired image display is secured. The previous frame image IMG2 instructed by the slide operation is displayed in the area excluding the display area of the reduced kept image IMG1. Subsequently, if a slide operation by the finger F1 is further detected within the display area of the currently displayed frame image, the previous or subsequent frame image corresponding to the slide operation is displayed in the area excluding the display area of the reduced kept image IMG1.

In the above mentioned embodiment, the operation in case that the user is right handed is described. However, if the user is left handed, the hand and the finger for performing the slide operation and issuing the image keep instruction can be inverted from right to left or left to right.

According to the embodiment of the presently disclosed subject matter, while viewing the kept image, the user can refer to another frame image. It is a convenient function when the user wants to see the previous or following images while looking at an image.

<Second Embodiment>

Figure 6:
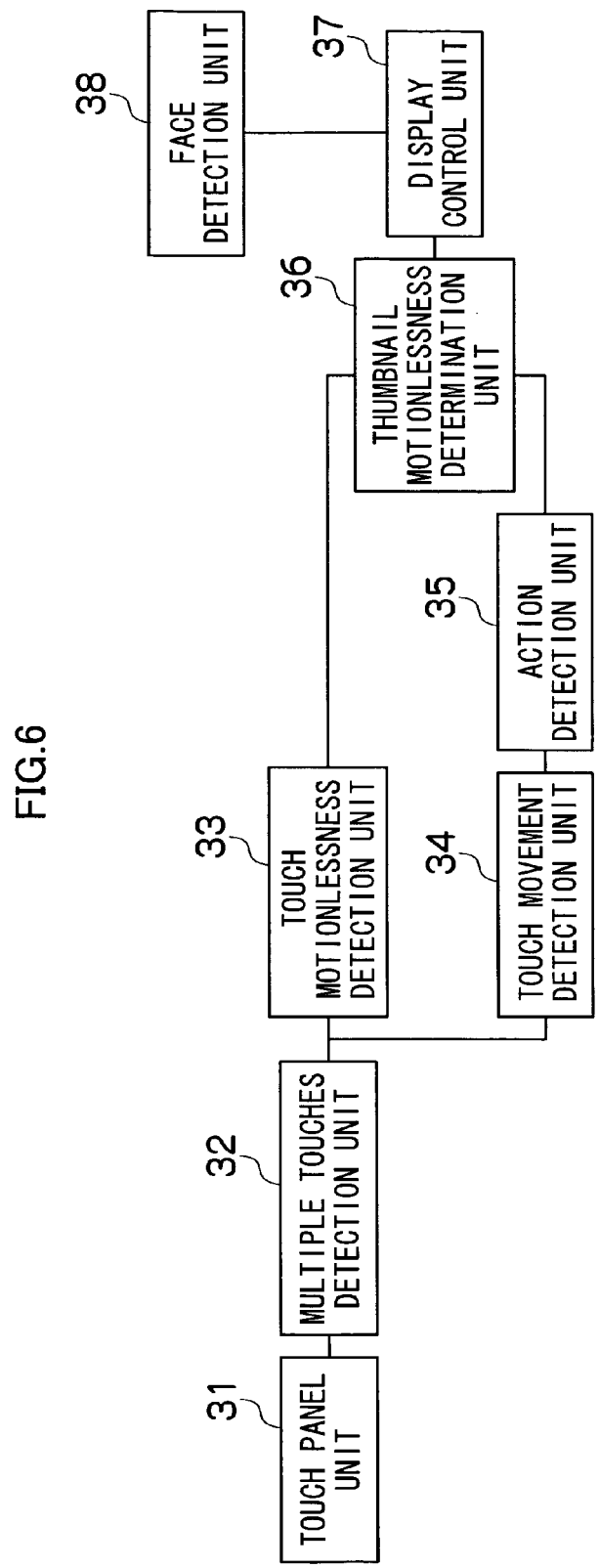
FIG. 6 is a block diagram illustrating a part of the information display apparatus of a second embodiment.
Figure 8A:
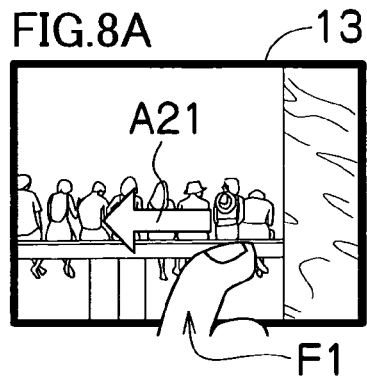
Figure 8B:
Figure 8C:
Figure 8D:
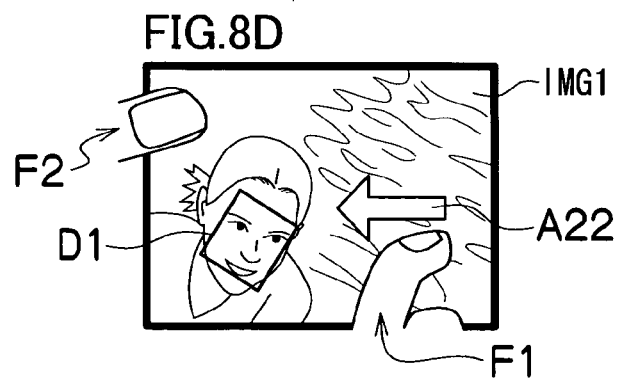

FIG. 6 is a block diagram illustrating a part of the information display apparatus 100. The same configurations as in the first embodiment are designated with the same reference numerals. The face detection unit 38 detects a face from the frame images (including the kept image). A known method can be used as a specific method of face detection, such as a face detection method by edge detection or shape pattern detection, a feature point vector approximation method in which a feature point represented by a coordinate of a feature part is vectorized and the feature point vector is approximated and detected, an area detection method by hue detection or flesh color detection, and face determination based on a correlation value with a template as described in Japanese Patent No. 4127521. The face detection unit 38 may be a processing unit of a program (stored in the ROM 12) executed by the CPU 10, or may be constituted by a logic circuit different from the CPU 10.

The face detection unit 38 may be replaced by a block which detects a specific area or an object of interest, such as an animal, a car, a building, and clouds, the object which is considered to be important in browsing the kept image. The object detected from the frame image may correspond to an image shooting mode designated from the operation input unit 14 at the time of taking the image. For example, if a portrait mode is set, a human face is detected, and if a landscape mode is set, clouds or a building is detected. If the displayed information includes character strings, specific character strings, such as a photographer name, a date and time of photographing, and a copyright holder, may be detected from the character strings.

FIG. 7 is a flowchart illustrating a display process according to the second embodiment. The ROM 12 stores a program for the CPU 10 to execute the process.

Steps S11 to S17 are substantially the same as steps S1 to S7 respectively.

In step S18, the face detection unit 38 performs face detection processing on the kept image, and determines whether or not the face is detected. If "YES" (the face is detected form the kept image), the process proceeds to step S19. If "NO" (the face is not detected form the kept image), the process proceeds to step S20.

Step S19 is similar to step S8. In step S19, the kept image is reduced and displayed on or near the keep position. At the same time, the currently displayed frame image is switched to the frame image next in the order or previous in the order in accordance with a frame forward or backward action. The display position of the kept image is determined so that the face area detected from the kept image does not overlap the pressed position of the image keep instruction (keep instruction position), and the finger and the face do not overlap. Then, the reduced kept image is displayed at the determined position. Furthermore, the face detection may also be performed on the currently displayed frame image (current frame image), the display position of the kept image may be determined so that the face area detected from the kept image does not overlap the keep instruction position, and the face detected from the current frame image and the kept image do not overlap, and then, the reduced kept image may be displayed at the determined position. In this way, browsing of an important or interested part of the kept image or the current frame image is not disturbed.

Step S20 is similar to step S8. Steps S21 to S23 are similar to steps S9 to S11 respectively.

FIGS. 8A to 8J are diagrams illustrating an example of image display in accordance with a forward or backward action and an image keep instruction. Arrows A21 to A24 indicate the direction along which the finger moves, and are not displayed information.

FIGS. 8A to 8G are similar to the frame images and a kept image shown in FIGS. 4A to 4G. Unlike FIGS. 4B to 4G, the face of a subject is detected from a current frame image IMG1 of FIG. 8B and a kept image IMG1 of FIGS. 8C to 8F. Graphics such as a frame D1 indicating the detected face area may be displayed. If browsing may be disturbed by the frame D1 or the graphics, the display control unit 37 may control the display/nondisplay of the graphics in accordance with the selection result accepted by the operation input unit 14.

As shown in FIG. 8G, the face area which is detected from the kept image IMG1, and indicated by the frame D1 avoids overlapping the pressed position of the finger F2 of the user. Therefore, the user's finger does not disturb browsing of a specific object such as the face of the kept image IMG1.

Alternatively, as shown in FIG. 8H, to show the user the state that the kept image is secured, the display control unit 37 may display an image of a tab at the space between the screen edge and the kept image IMG1 generated by the position determination in step S22. Also, the display control unit 37 may blink on and off the kept image IMG1 or the periphery of the kept image IMG1. Also, the display control unit 37 may output a sound indicating that an audio playback circuit not shown has started keeping. The display area of the tab may include the pressed area.

Alternatively, as shown in FIG. 8I, the display control unit 37 may make the kept image translucent or lower the color density so that the frame image in the background can be seen through the kept image. In that case, only the face area of the kept image may be displayed as it is without making it translucent.

In case of FIG. 8J, when the current frame image is displayed in full-size, it is difficult to determine the display position of the kept image so that the face area in the current frame image does not overlap with the pressed position of the kept image. In this case, the current frame image may be reduced while maintaining the aspect ratio of the current frame image to create a margin area around the keep position where the current frame image is not displayed. And then, the detected object (face area) of the current frame image does not overlap the kept image, and a position of the kept image may be determined so that the keep position and the detected object do not overlap.

<Third Embodiment>

Figure 9:
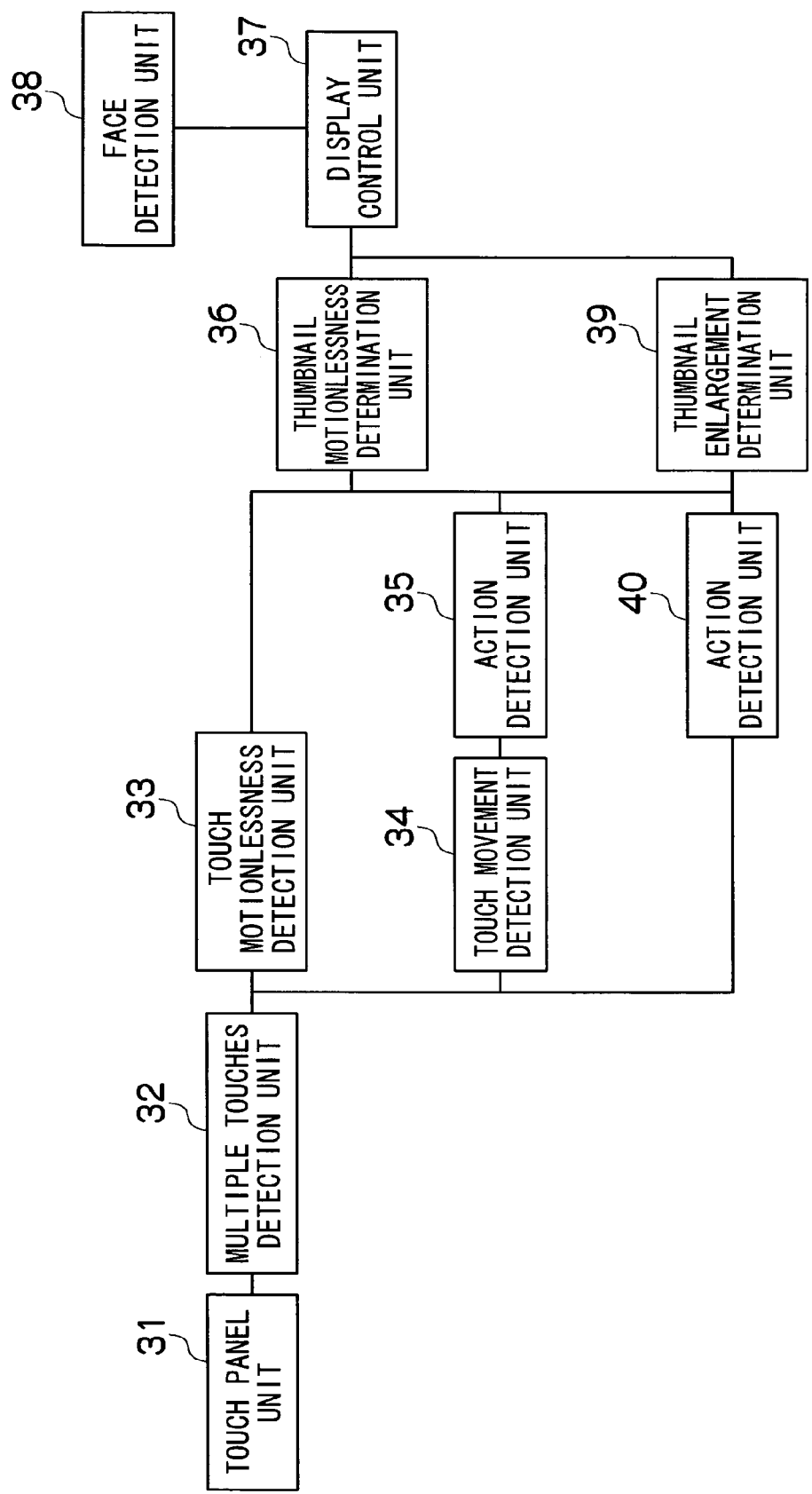
FIG. 9 is a block diagram illustrating a part of the information display apparatus of a third embodiment.

FIG. 9 illustrates a part of an information display apparatus 100 according to the third embodiment. The same configurations as in the first embodiment are designated with the same reference numerals.

An action detection unit 40 determines an action on the display area of the kept image which the action detection unit 35 does not detect, such as a single tap, double tap, and tap & drag. More specifically, it can be distinguished that an action detected by the action detection unit 35 relates to the display of the current frame image and an action detected by the action detection unit 40 relates to the display of the kept image.

A thumbnail enlargement determination unit 39 determines whether an enlargement instruction of the reduced kept image is issued in accordance with the action detected by the action detection unit 40, and notifies a result of the determination of the thumbnail enlargement determination unit 39 to the display control unit 37 if the enlargement instruction is issued.

FIG. 10 is a flowchart of a display process according to the third embodiment. The ROM 12 stores a program for the CPU 10 to execute the process.

Steps S31 to S40 are equivalent to steps S11 to S20 of the second embodiment respectively. In step S36, it is determined whether the reduced kept image is already displayed on the display unit 13. If "YES" (the reduced kept image is already displayed on the display unit 13), the process proceeds to step S41, and if "NO" (the reduced kept image is not displayed on the display unit 13), the process proceeds to step S37.

In step S41, the action detection unit 40 detects that a pressed position other than the pressed position detected by the touch motionlessness detection unit 33 is moved, or detects a tap & drag operation. If a tap & drag operation is detected, it is determined whether the first pressed position as an origin of the tap & drag operation is included in the display area of the kept image. If "YES" (the first pressed position is included in the display area of the kept image), the process proceeds to step S42, and if "NO" (the first pressed position is not included in the display area of the kept image), the process proceeds to step S44.

In step S42, the fact that an enlargement instruction of the kept image is issued is detected.

In step S43, the kept image is enlarged in accordance with the amount of movement of the tap & drag operation. This operation is similar to an operation of enlarging the image, and can be intuitively understood. Instead of the tap & drag operation, the action detection unit 40 may detect a single tap operation twice, and enlarge the kept image at an enlargement ratio corresponding to the distance from the pressed position of the first tap operation to the pressed position of the second tap operation. Unless the kept image is enlarged to the full-size (the same size as the screen of the display unit 13), both the current frame image and the kept image can be displayed, and the current frame image and the kept image can be compared thoroughly. The operation is similar to the indication of a diagonal point of the image display area, and can be intuitively understood. Alternatively, the kept image may be enlarged to a predetermined size, for example, the full-size, at once with the first double tap, and the enlargement may be terminated with the second double tap to restore the original reduced size. This is effective in a quick enlargement. Although the face area of the current frame image may be hidden when the kept image is enlarged, this is ignored.

Steps S44 to S46 are substantially the same as steps S21 to S23 respectively.

FIG. 11 illustrates an example of image display in accordance with an enlargement instruction of a kept image. Arrows A31 to A34 indicate direction along which the finger moves, and are not displayed information.

FIGS. 11A to 11D show the cases in which the face is not detected, and FIGS. 11E to 11H show the cases in which the face is detected. As shown in FIG. 11A, a finger F1 of the right hand of the user taps an edge of the kept image IMG1 while a finger F2 of the left hand which instructs the kept image IMG1 is left unmoved. As shown in FIG. 11B, the tapping finger F1 of the right hand is dragged toward the screen center. As shown in FIG. 11C, the kept image IMG1 reduced around the keep position is enlarged in accordance with the amount of movement of dragging, and the current frame image IMG2 is hidden behind the enlarging kept image IMG1. Once the full-size display (maximum image within the display screen is enlarged and displayed while the aspect ratio of the image is maintained) starts, the display is maintained even if the tapping finger is released. However, if dragging is released before reaching the full-size display, the kept image IMG1 is returned to the original reduced state.

As shown in FIG. 11D, when the dragged position reaches the lower edge or the right edge of the screen, the kept image IMG1 is displayed full screen. If the dragging finger F1 is pulled away from the screen, or if the action detection unit 40 does not detect the pressing of tap & drag any more, the enlargement display of the kept image IMG1 may be cancelled, and the reduced kept image IMG1 may be displayed around the original keep position.

FIGS. 11E to 11H are similar to FIGS. 11A to 11D respectively, except that the face detection position (indicated by the frame D1) of the reduced kept image IMG1 and the keep instruction position are displayed without overlapping (same as step S19).

In this way, the kept image IMG1 is enlarged and displayed with an intuitive operation such as tap & drag and double tap.

<Fourth Embodiment>

Figure 12:
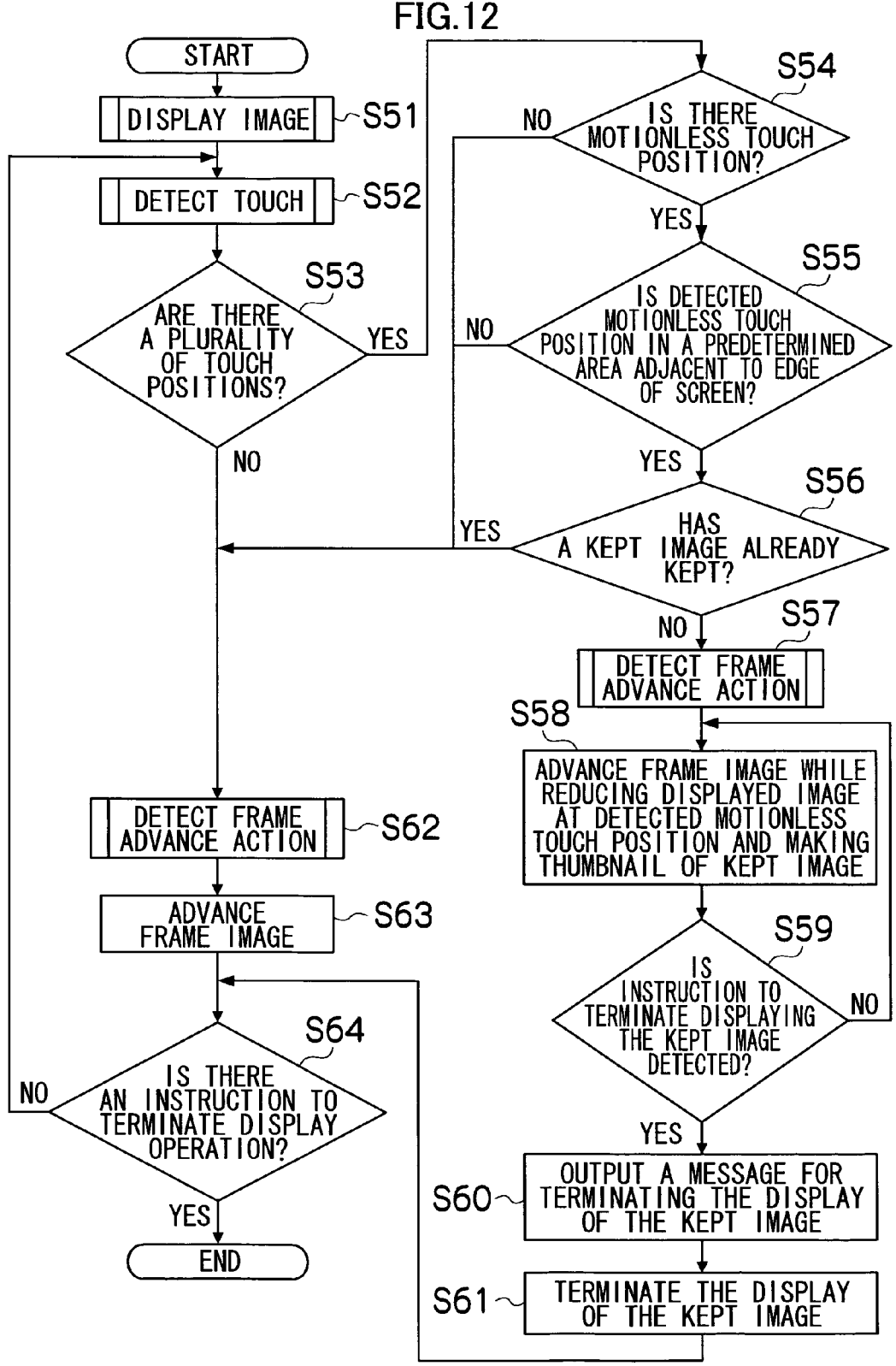
FIG. 12 is a flowchart illustrating a display process of a fourth embodiment.

To continue displaying the kept image even if the fixed finger is pulled away from the screen of the display unit 13, in the first to third embodiments, the following process is executed. FIG. 12 is a flowchart of an enlargement process according to a fourth embodiment. The ROM 12 stores a program for the CPU 10 to execute the process.

Steps S51 to S58 are similar to steps S1 to S8 respectively. However, in step S58, even if the touch motionlessness detection unit 33 does not detect the still pressed position any more, the display of the kept image continues unless a special instruction for terminating the display of the kept image is inputted to the operation input unit 14.

In step S59, a special instruction for terminating the display of the kept image, such as a second double tap in the display area of the reduced or enlarged kept image, is detected.

In step S60, a message for terminating the display of the kept image is displayed. Alternatively, a sound indicating the termination may be outputted.

In step S61, the display of the kept image is terminated. The current frame image is displayed at the part where the kept image is not displayed any more.

FIGS. 13A to 13D illustrate an example of the display continuation of the kept image after the contact of the finger which has instructed keeping is released. Arrows A41 and A42 indicate the direction along which the finger moves, and are not displayed information.

FIG. 13A illustrates a state that the contact of the finger F2 which has instructed keeping is released. According to step S58, if the contact of the finger F2 is just released, the display of the reduced kept image IMG1 continues as shown in FIG. 13B.

FIGS. 13C and 13D are similar to FIGS. 13A and 13B respectively, except that the face detection position of the kept image IMG1 and the keep instruction position are displayed without overlapping.

In this way, the display of the kept image IMG1 continues even if the user moves the finger F2, which the user has intentionally or unconsciously instructed to keep the image IMG1, away from the screen, and the burden for continuing the keep instruction is reduced.

<Fifth Embodiment>

To terminate the display of the kept image by double tapping, the following process is executed. FIG. 14 is a flowchart of a display process according to a fifth embodiment. The ROM 12 stores a program for the CPU 10 to execute the process. The process starts after the display process of the first to third embodiments is executed, and the kept image is displayed.

Steps S71, S72, and S73 are similar to steps S1, S2, and S41, respectively. However, the kept image is displayed in step S71. If "YES" (the detected touch (pressing) position is within the display area of the kept image) is determined in step S73, the process proceeds to step S74, and if "NO" (the detected touch (pressing) position is not within the display area of the kept image) is determined, the process proceeds to step S80.

In step S74, the action detection unit 40 detects a double tap in the display area of the kept image. If the double tap is detected, the process proceeds to step S77. And, if the double tap is not detected, the process proceeds to step S75.

In step S75, the determination which is similar to that of step S3 is made. If "YES", the process proceeds to step S76. And, if "NO", the process proceeds to step S78.

Steps S76 and S77 are similar to steps S42 and S43 respectively.

In step S78, the action detection unit 40 detects a slide operation in the display area of the kept image, and determines a movement instruction of the reduced kept image. The movement instruction of the kept image is detected when the pressed position is moved with an arbitrary position within the display area of the kept image as an origin.

In step S79, the reduced kept image is moved on the screen of the display unit 13 in accordance with the movement instruction of the kept image. More specifically, the reduced kept image is moved and displayed in accordance with the movement direction and the amount of movement of the pressed position with the position touched at first being the origin. During the movement of the kept image, the current frame image is hidden behind the kept image.

Steps S80 to S82 are similar to steps S9 to S11 respectively.

Reference Signs List

31: touch panel unit, 32: multiple touches detection unit, 33: touch motionlessness detection unit, 34: touch movement detection unit, 35: action detection unit, 36: thumbnail motionlessness determination unit, 37: display control unit, 38: face detection unit, 39: thumbnail enlargement determination unit, 40: action detection unit

The invention claimed is:

1. An information display apparatus comprising:
a display unit which includes a screen for displaying an image;
a touch detection unit which detects a touch position of an object on the screen of the display unit;
a counting unit which determine whether a plurality of touch positions are detected;
a motionlessness detection unit which detects a motionless touch position which is motionless for a predetermined time period in the plurality of detected touch positions;
a behavior detection unit which detects a behavior of a touch position other than the motionless touch position detected by the motionlessness detection unit among the plurality of detected touch positions;
an instruction detection unit which detects an instruction corresponding to the behavior of the touch position detected by the behavior detection unit; and
a control unit which controls, in accordance with the motionless touch position detected by the motionlessness detection unit and the instruction detected by the instruction detection unit, the display unit to reduce an display area of a kept image, the image being displayed on the display unit when the motionless touch position is detected, to a predetermined size to continue displaying the reduced kept image, and to display an image other than the reduced kept image, wherein
the instruction detection unit detects a display switch instruction to switch the display of the image other than the reduced kept image to a display of another image based on a slide operation, the another image being an image other than the kept image, the reduced kept image and the image other than the reduced kept image, and
the control unit controls the display unit to sequentially switch and display the different images in accordance with the detection of the display switch instruction by the instruction detection unit.

2. The information display apparatus according to claim 1, wherein the control unit controls the display unit to continue displaying the reduced kept image on or adjacent to the motionless touch position.

3. The information display apparatus according to claim 1, further comprising an area detection unit which detects an area including an object of interest from the kept image, wherein the control unit controls the display unit to continue displaying the reduced kept image at a position where the area including the object of interest detected by the area detection unit do not overlap with the motionless touch position.

4. The information display apparatus according to claim 3, wherein the control unit controls the display unit to display predetermined information, which indicates that the display of the kept image is kept, on or adjacent to the motionless touch position.

5. The information display apparatus according to claim 1, wherein the behavior detection unit detects a behavior of a touch position within the display area of the reduced kept image, the instruction detection unit detects an enlargement instruction of the reduced kept image at the touch position based on the behavior of the touch position within the display area of the reduced kept image detected by the behavior detection unit, and the control unit controls the display unit to enlarge the reduced kept image to a predetermined size, and displays the enlarged kept image in accordance with the detection of the enlargement instruction by the instruction detection unit.

6. The information display apparatus according to claim 5, wherein the instruction detection unit detects the enlargement instruction of the reduced kept image at the touch position based on a tap and drop operation or a double tap operation within the display area of the reduced kept image.

7. The information display apparatus according to claim 1, wherein the control unit controls the display unit to continue displaying the reduced kept image until the instruction detection unit detects a display termination instruction to terminate the display of the kept image.

8. An information display method for displaying an image by an information display apparatus comprising a display unit which includes a screen for displaying an image, comprising steps of:
detecting a touch position of an object on the screen of the display unit;
determining whether a plurality of touch positions are detected;
detecting a motionless touch position which is motionless for a predetermined time period in the plurality of detected touch positions;
detecting a behavior of a touch position other than the motionless touch position among the plurality of detected touch positions;
detecting an instruction corresponding to the behavior of the touch position; and
controlling, in accordance with the motionless touch position and the detected instruction, the display unit to reduce an display area of a kept image, the image being displayed on the display unit when the motionless touch position is detected, to a predetermined size to continue displaying the reduced kept image, and to display an image other than the reduced kept image, wherein
the detecting an instruction step detects a display switch instruction to switch the display of the image other than the reduced kept image to a display of another image based on a slide operation, the another image being an image other than the kept image, the reduced kept image and the image other than the reduced kept image, and
the controlling step controls the display unit to sequentially switch and display the different images in accordance with the detection of the display switch instruction.

9. A non-transitory recording medium comprising a computer program causing an information display apparatus comprising a display unit which includes a screen for displaying an image, to execute a process for a displaying the image, the process comprising steps of:

detecting a touch position of an object on the screen of the display unit;

determining whether a plurality of touch positions are detected;

detecting a motionless touch position which is motionless for a predetermined time period in the plurality of detected touch positions;

detecting a behavior of a touch position other than the motionless touch position among the plurality of detected touch positions;

detecting an instruction corresponding to the behavior of the touch position; and controlling, in accordance with the motionless touch position and the detected instruction, the display unit to reduce an display area of a kept image, the image being displayed on the display unit when the motionless touch position is detected, to a predetermined size to continue displaying the reduced kept image, and to display an image other than the reduced kept image, wherein the detecting an instruction step detects a display switch instruction to switch the display of the image other than the reduced kept image to a display of another image based on a slide operation, the another image being an image other than the kept image, the reduced kept image and the image other than the reduced kept image, and the controlling step controls the display unit to sequentially switch and display the different images in accordance with the detection of the display switch instruction.

* * * * *